(12) United States Patent
Krikorian et al.

(10) Patent No.: US 8,819,126 B2
(45) Date of Patent: *Aug. 26, 2014

(54) DISTRIBUTED CONTROL FOR A CONTINUOUS PLAY BACKGROUND MUSIC SYSTEM

(71) Applicant: Intellectual Ventures Fund 47 LLC, Las Vegas, NV (US)

(72) Inventors: Thomas M. Krikorian, West Bloomfield, MI (US); Simon J. Mccluskey, Canton, MI (US)

(73) Assignee: Intellectual Ventures Fund 47 LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,530

(22) Filed: Dec. 10, 2012

(65) Prior Publication Data
US 2013/0138779 A1    May 30, 2013

Related U.S. Application Data

(63) Continuation of application No. 12/705,100, filed on Feb. 12, 2010, now Pat. No. 8,352,543, which is a continuation of application No. 09/579,393, filed on May 26, 2000, now Pat. No. 7,668,936.

(51) Int. Cl.
*G06F 15/16* (2006.01)
(52) U.S. Cl.
USPC .............................. 709/203; 709/217; 725/1
(58) Field of Classification Search
USPC ......... 709/223, 231, 245, 219, 203, 217, 218; 725/1
See application file for complete search history.

(56) References Cited

U.S. PATENT DOCUMENTS

| | | |
|---|---|---|
| 5,541,917 A | 7/1996 | Farris |
| 5,557,658 A | 9/1996 | Gregorek et al. |
| 5,616,876 A | 4/1997 | Cluts |
| 5,726,909 A | 3/1998 | Krikorian |
| 5,790,423 A | 8/1998 | Lau et al. |
| 5,808,662 A | 9/1998 | Kinney et al. |
| 5,955,710 A | 9/1999 | DiFranza |
| 5,996,015 A | 11/1999 | Day et al. |
| 6,064,379 A | 5/2000 | DeMoney |
| 6,148,328 A | 11/2000 | Cuomo et al. |
| 6,170,060 B1 | 1/2001 | Mott et al. |
| 6,243,725 B1 | 6/2001 | Hempleman et al. |
| 6,246,672 B1 | 6/2001 | Lumelsky |
| 6,308,204 B1 | 10/2001 | Nathan et al. |

(Continued)

OTHER PUBLICATIONS

Chain Storage Age; DMX Axis: Music Delivery via; Feb. 2000, pp. 2A-3A, 5A-11A.

*Primary Examiner* — Lashonda Jacobs
(74) *Attorney, Agent, or Firm* — Novak Druce Connolly Bove + Quigg LLP

(57) ABSTRACT

A system and method executed at a computing device for providing digital content, is provided. The method includes: remotely providing digital media files via a network to a playback device responsively to a computer being remotely located from both the computing device and the playback device; receiving at least one first communication from the computer via the network; and sending at least one second communication to the playback device via the network and based upon the first communication. Playback of ones of the provided digital media files at the playback device is modified responsively to the at least one second communication.

18 Claims, 19 Drawing Sheets

(56) References Cited

U.S. PATENT DOCUMENTS

| | | |
|---|---|---|
| 6,351,736 B1 * | 2/2002 | Weisberg et al. .......... 705/14.46 |
| 6,357,047 B1 * | 3/2002 | Kurtze et al. ................. 725/151 |
| 6,389,467 B1 * | 5/2002 | Eyal .............................. 709/223 |
| 6,434,621 B1 | 8/2002 | Pezzillo et al. |
| 6,446,080 B1 | 9/2002 | Van Ryzin et al. |
| 6,496,856 B1 | 12/2002 | Kenner et al. |
| 6,526,411 B1 | 2/2003 | Ward |
| 6,546,427 B1 | 4/2003 | Ehrlich et al. |
| 6,587,127 B1 | 7/2003 | Leeke et al. |
| 6,662,231 B1 | 12/2003 | Drosset et al. |
| 6,741,869 B1 | 5/2004 | Lehr |
| 6,757,661 B1 | 6/2004 | Blaser et al. |
| 6,792,469 B1 | 9/2004 | Callahan et al. |
| 6,807,565 B1 | 10/2004 | Dodrill et al. |
| 6,823,725 B2 | 11/2004 | Lohberg |
| 6,931,451 B1 * | 8/2005 | Logan et al. .................. 709/231 |
| 6,970,834 B2 | 11/2005 | Martin et al. |
| 7,058,036 B1 | 6/2006 | Yu et al. |
| 7,100,116 B1 | 8/2006 | Shafrir et al. |
| 7,272,780 B2 | 9/2007 | Abbott et al. |
| 7,516,411 B2 | 4/2009 | Beaton et al. |
| 7,870,281 B2 | 1/2011 | Masunaga et al. |
| 8,214,462 B1 * | 7/2012 | Rosenberg et al. ........... 709/219 |
| 8,230,343 B2 * | 7/2012 | Logan et al. .................. 715/723 |
| 2001/0027561 A1 | 10/2001 | White et al. |
| 2001/0037367 A1 | 11/2001 | Iyer |
| 2001/0049826 A1 | 12/2001 | Wilf |

* cited by examiner

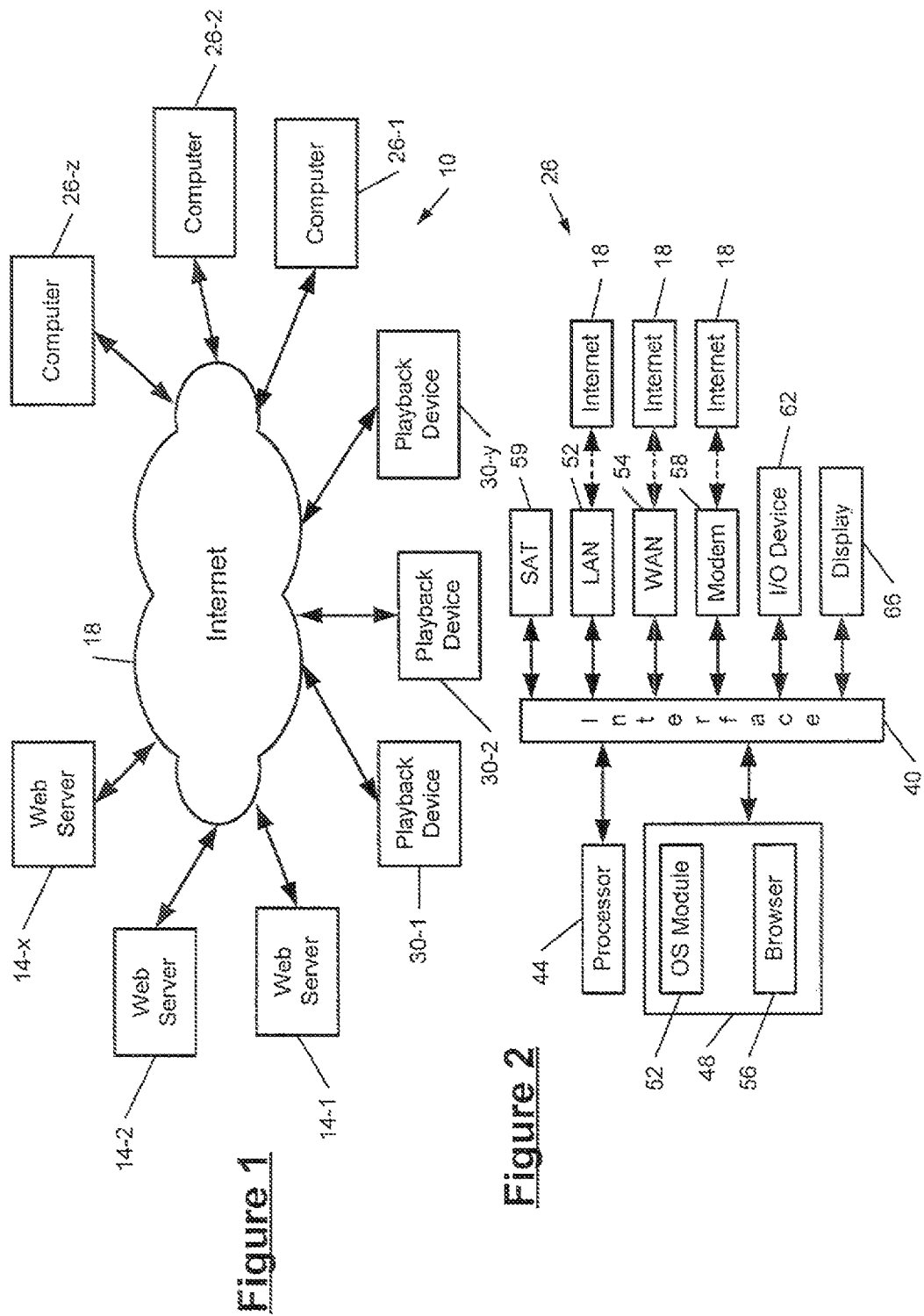

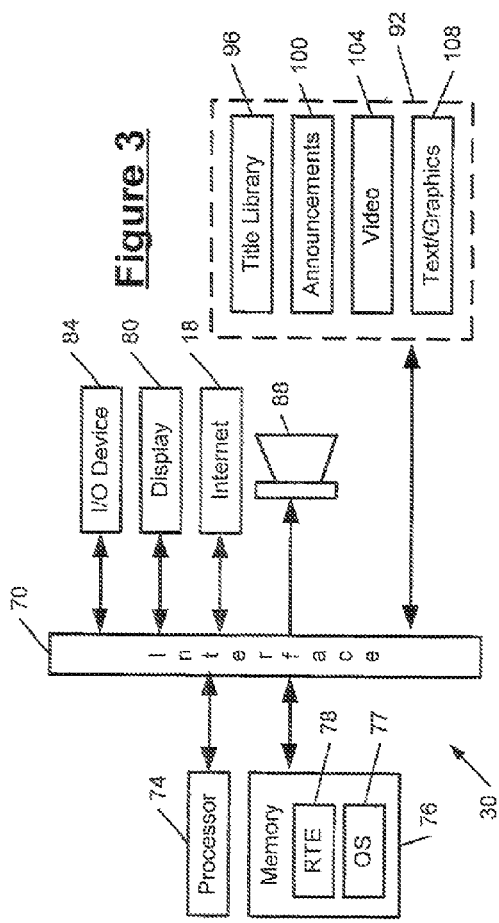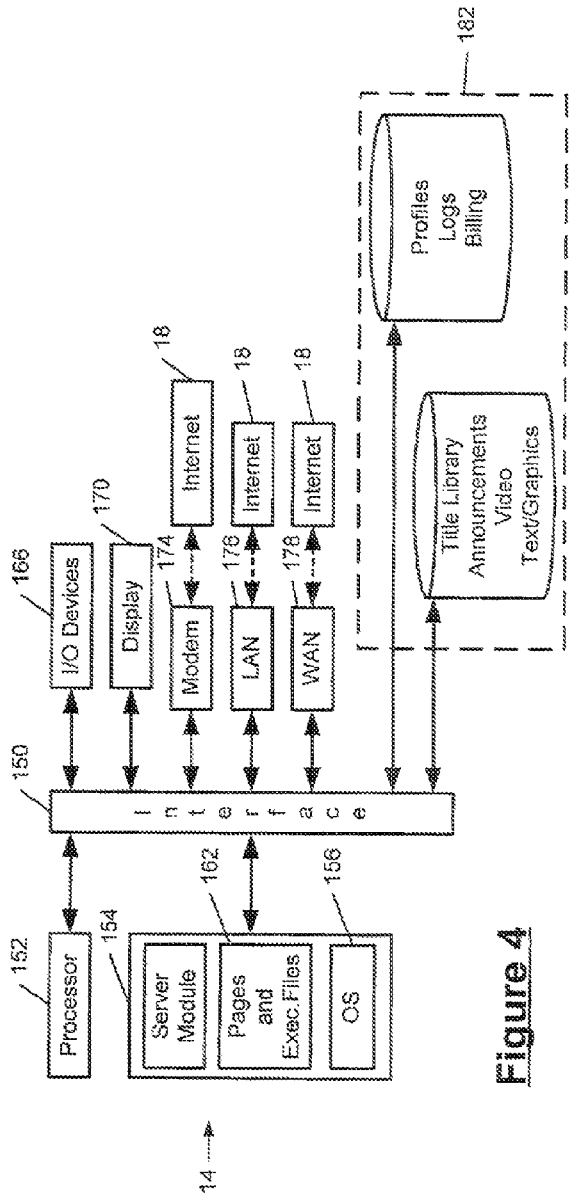

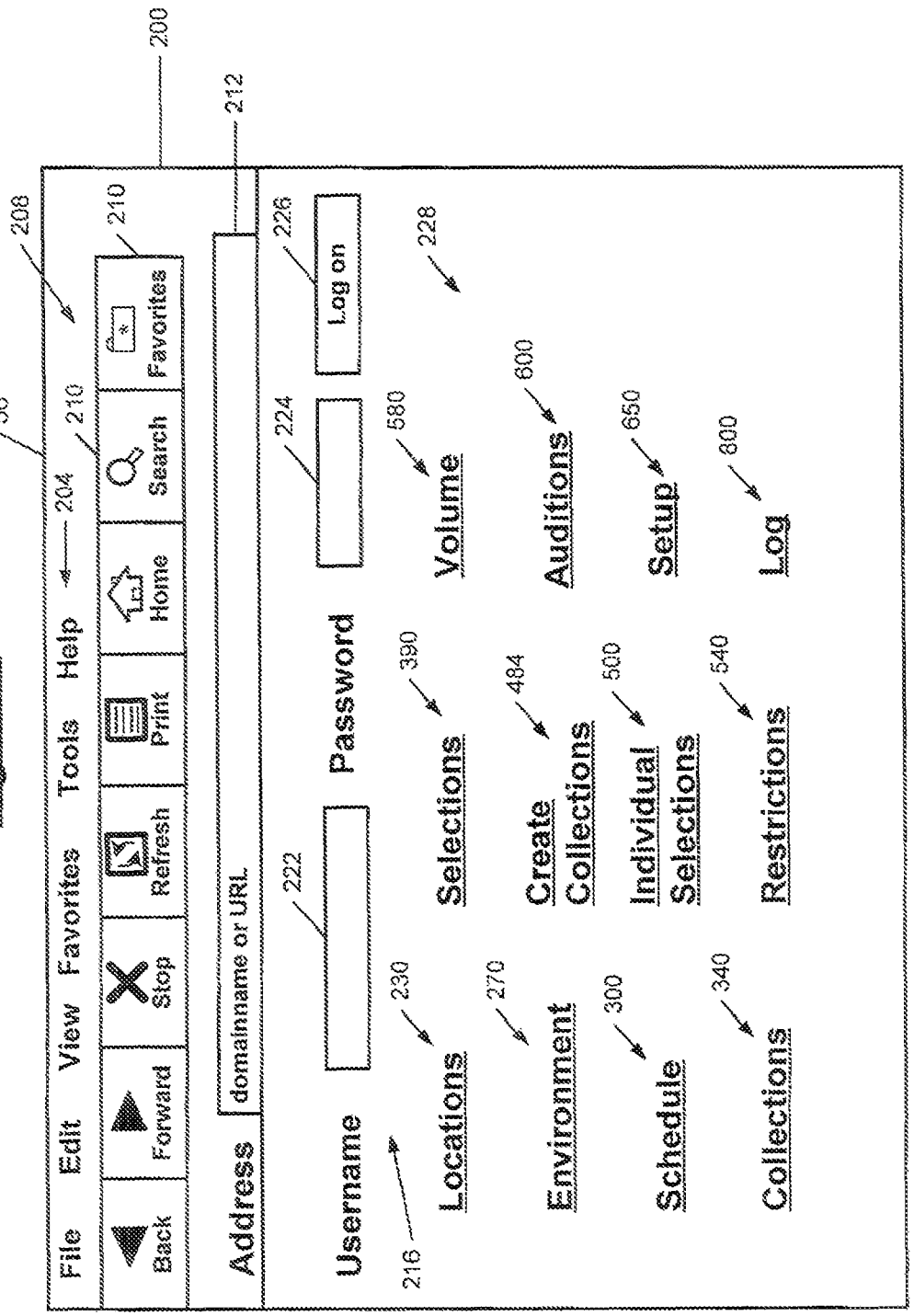

DISTRIBUTED CONTROL FOR A CONTINUOUS PLAY BACKGROUND MUSIC SYSTEM

CROSS REFERENCE TO RELATED APPLICATIONS

The instant application is a continuation of U.S. Ser. No. 12/705,100 filed on Feb. 12, 2010 entitled DISTRIBUTED CONTROL FOR A CONTINUOUS PLAY BACKROUND MUSIC SYSTEM and now U.S. Pat. No. 8,352,543, which is a continuation of U.S. Ser. No. 09/579,393 filed May 26, 2000 entitled CONTINUOUS MEDIA PLAYBACK SYSTEM CONTROLLED OVER A DISTRIBUTED COMMUNICATION SYSTEM and now U.S. Pat. No. 7,668,936.

FIELD OF THE INVENTION

The present invention relates generally to background media systems. More particularly, the present invention relates to a background media system for generating a continuous play program for one or more playback control devices.

BACKGROUND OF THE INVENTION

Background media systems are generally used by commercial enterprises to create an environment that enhances a customer's experience while in a facility run by the commercial enterprise. For example, the owner of a diner with a 1960's theme typically decorates the diner with memorabilia from the 1960s and plays music, announcements and/or video that reflects that era. In contrast, the owner of an upscale clothing store in New York would choose a different décor and would play a more contemporary mix of music and video. As different commercial enterprises attempt to differentiate themselves in the marketplace, demand increases for customization of media such as background audio, announcements, and video that are presented to customers within the premises.

Franchise owners spend a lot of time and money generating good will in their business names through advertising, quality control, and efforts to present a consistent and positive experience for customers who visit their locations. Franchise owners typically create strict rules relating to the appearance of the franchise facility. Franchise owners may also wish to strictly control the music, video and announcements that play within their franchise facilities.

Most conventional background media systems typically include only background music. In some systems, music formats are sent to the users on a regular basis in the form of tapes, compact discs (CDs) or digital video discs (DVDs). The music formats are played on proprietary systems that may include devices for storing the music formats for future use. Other systems transmit background music via a satellite broadcast or a frequency modulated (FM) sub-carrier frequency to specially-designed receiving equipment that is located in the enterprise's facility. While providing a relatively inexpensive way to receive the background music, these background media systems are generally limited in that the commercial enterprise cannot tailor the formats beyond those provided by the background media system vendor. If custom music formats or playlists can be obtained, they generally cost too much for small or medium sized commercial enterprises. While satellite systems offer different audio formats on different channels, the number of available channels is limited. As customers request more highly customized audio and video environments for their facilities, the demand for additional channels will exceed the available bandwidth. Generally theses systems also require that the video, announcements and other media be handled with separate systems.

The conventional background media systems also have a disadvantage in that when specialized announcements are mixed into the background music and video, the background music and video is abruptly interrupted for the announcements.

SUMMARY OF THE INVENTION

The above and other objects are provided by a continuous play broadcast system that includes a distributed communications system and a playback control device that is connected to the distributed communications system. The playback control device includes one or more output devices, memory that stores digital media files and a continuous play program, and a controller that outputs the digital media files to the output device according to the continuous play program. The media files include at least one of audio files, video files and announcement files. A computer is connected to the distributed communications system. A web server is connected to the distributed communications system and to a master library of the digital media files. The computer accesses the web server via the distributed communications system to alter the continuous play program for the playback control device.

According to other features of the invention, the computer includes a browser module for accessing the web server and the web server transmits executable files to the computer for creating the continuous play program. The executable files are at least one of Active-X® components, Java Applets® and Java Script®.

According to still other features of the invention, the executable files allow the computer to select and arrange custom playlists by selecting a plurality of the digital media files from the master library and by allowing at least one of sequencing the digital media files and randomly playing the digital media files. The executable files also allow the computer to select a plurality of predetermined collections of the digital media files, to allocate percentages to the plurality of predetermined collections and to create a composite collection that randomly selects the digital media files from the collections based on the allocated percentages. The executable files also allow the computer to select at least one of the digital media files within the predetermined collections and to increase or decrease the likelihood that the at least one of the digital media files is played in the composite collection. The executable files also allow the computer to select at least one of the digital media files within the predetermined collections and to prevent the at least one of the digital media files from playing in the composite collection. The executable files also allow the computer to select at least one of the digital media files within the predetermined collections and to prevent the at least one of the digital media files from playing during preselected times in the composite collection.

In yet other features of the invention, the executable files allow the computer to assign the predetermined collections to a time-based schedule that forms part of the continuous play program. The executable files also allow the computer to assign the composite collection to the time-based schedule.

Still other objects, features and advantages will be readily apparent.

BRIEF DESCRIPTION OF THE DRAWINGS

FIG. 1 is a functional block diagram of a continuous play background media system according to the invention;

FIG. 2 is a functional block diagram of a computer from FIG. 1;

FIG. 3 is a functional block diagram of a playback control device of FIG. 1;

FIG. 4 is a functional block diagram of a web server of FIG. 1;

FIG. 5 illustrates a browser and a log-on interface for the continuous play background media system;

DETAILED DESCRIPTION OF THE PREFERRED EMBODIMENTS

Figure 6:
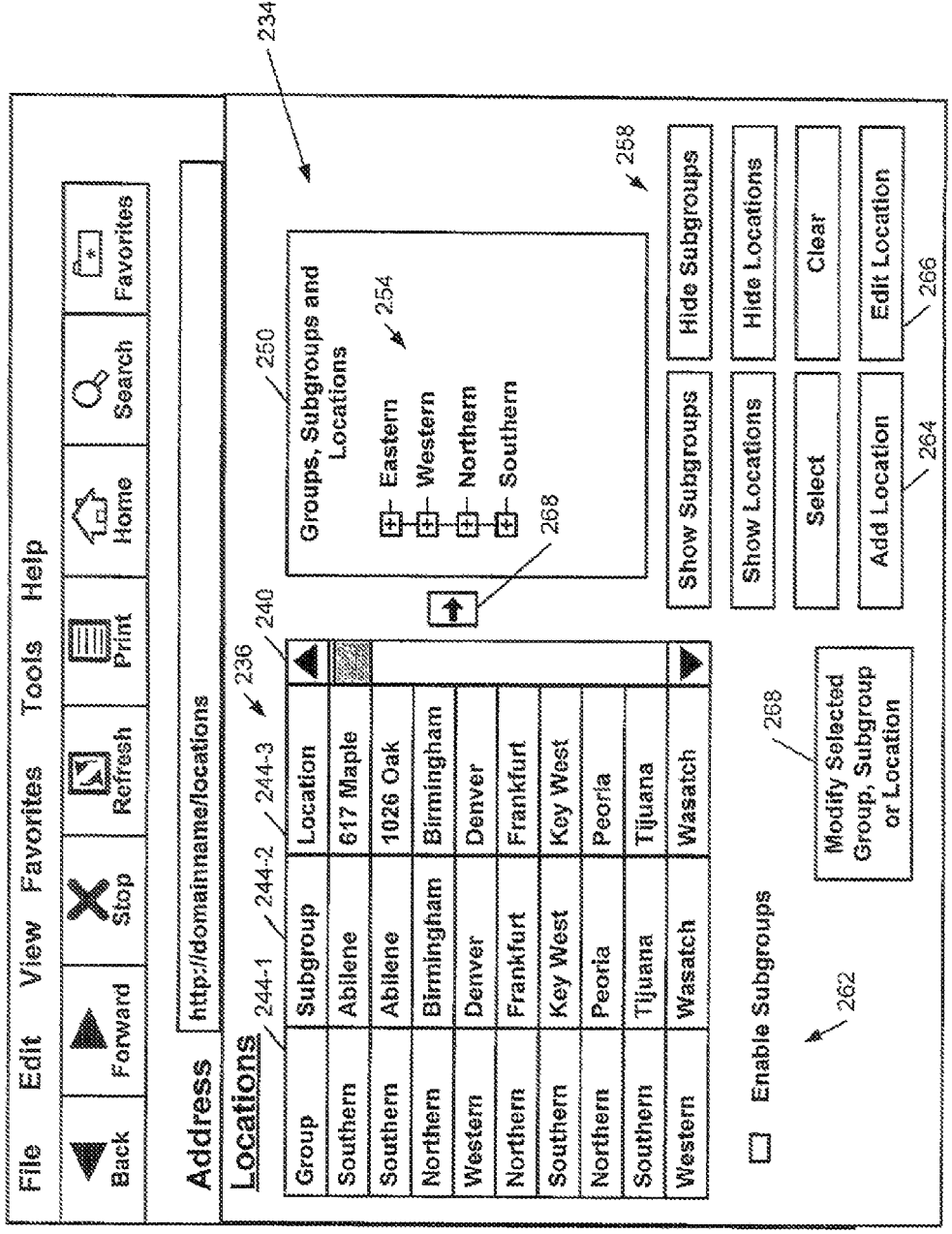
FIG. 6 illustrates a location interface for the continuous play background media system.

Referring now to FIG. 1, a control system for a continuous play background media system is illustrated and is generally designated 10. Web servers 14-1, 14-2, ..., and 14-x are connected to a distributed communications system 18 such as the internet. Computers 26-1, 26-2, ..., and 26-y are connected to the distributed communications system 18. Playback control devices 30-1, 30-2, ..., and 30-z are connected to the distributed communications system 18.

In use, the playback control devices 30 are located in various commercial environments. For example, the computer 26-1 accesses the web server 14-2 to create continuous play programs which are downloaded to the playback control devices 30-1, 30-2, 30-3, and 30-4. The playback control devices 30 execute the continuous play program to provide background music, announcements, and/or video in a commercial facility. As used herein, selections and media refer to audio, music, music with video, video, still images, and/or announcements. The audio can be music, sound effects or other recorded sounds. The video can be moving or still images. When changes to the continuous play programs are required, the computer 26-1 accesses the web server 14-2 to alter the continuous play program. The continuous play program allows a user to arrange selections such as video, audio, and announcements into one or more collections. The collections are assigned to time blocks during the day. Once the continuous play program is setup, the selections are played in a continuous manner without the need for user control.

Referring now to FIG. 2, a block diagram illustrating the computer 26 is shown. The computer 26 includes an input/output (I/O) interface 40, a processor 44, and memory 48. The memory 48 can include read-only memory (ROM), random access memory (RAM), and/or external memory storage such as a hard drive, a floppy drive, an optical drive, or other suitable external memory storage. The memory 48 contains an operating system (OS) module 52 and a browser 56. In a preferred embodiment, the browser 56 is capable of receiving executable files via web servers 14. Suitable browsers 56 include, but are not limited to, Internet Explorer and Netscape. The executable files that work with the browsers include but are not limited to ActiveX® components, Java Applets® or JavaScript®. Skilled artisans can appreciate that the continuous play programs can also be adapted for use in distributed systems that do not employ executable files.

The computer 26 is connected to the distributed communications system 18 in any suitable manner such as through cable systems (cable and fiberoptic), satellite-based systems, terrestrial-based systems, or any other suitable manner. As can be appreciated, if satellite-based systems are employed, the bandwidth available for updates is dramatically improved over phone bandwidths. The computer 26 can be connected to the distributed communications system 18 through a local area network (LAN) 52, a wide area network (WAN) 54, or through a cable-based or phone-based modem 58. Alternately, a satellite-based connection 59 can be used. One or more I/O devices 62 such as a keyboard, a mouse, a printer, a scanner, or other devices are connected to the I/O interface 40. A computer display 66 is likewise connected to the I/O interface 40.

Referring now to FIG. 3, the playback control device 30 is illustrated in further detail. The playback control device 30 includes an I/O interface 70, a processor 74, and memory 76. The memory 76 includes RAM, ROM, and external memory storage such as hard drives, floppy drives, optical drives, or other suitable storage. The memory 76 preferably executes an OS 77 and a run time engine (RTE) 78 for executing a continuous play program as will be described further below. In a preferred embodiment, the OS is a Windows®-based system such as Windows 2000®. An Apple®-based OS, Unix®, Linux®, or other OS can be used without departing from the spirit of the invention.

The playback control device 30 optionally includes a display 80 and one or more I/O devices 84 that can include a mouse, keyboard, or other suitable I/O devices. The display 80 is preferably a television display or a peripheral for presenting video to customers within the enterprise facility. If a television display or peripheral is employed, the playback control device 30 preferably includes a standard video output connection. Alternately, the display 80 can be a computer display. The display 80, the keyboard, and the mouse are not required to operate the playback control device. The playback control device 30 is intended to be a stand-alone device that needs to be turned on. Thereafter, the continuous play program operates the playback control device 30. The playback control device 30 is connected to the distributed communications system 18 in any of the ways described above with respect to the computer 26.

Speakers 88 are connected to the I/O interface 70. The speakers 88 are preferably positioned in various locations throughout the commercial enterprise. One or more databases 92 include a song library 96 which contains a plurality of digital audio files containing audio such as music, an announcement library 100 that contains digital announcement files, a video library 104 that contains video or still picture files, and/or a text/graphics library 108. The text/graphic library 108 contains media that can be included in advertisements for printed publications, displayed using peripherals, computer displays, or televisions and/or used in any other manner.

In use, the playback control device 30 executes the continuous play program that automatically plays selections stored in the databases 92. Periodically, the computer 26 alters the continuous play program via the web server 14. The web server 14 provides new selections and a continuous play program to update the playback control device 30 via the distributed communications system 18.

Referring now to FIG. 4, the web server 14 is illustrated in further detail. The web server 14 includes an I/O interface 150 that is connected to a processor 152 and memory 154. The memory 154 preferably includes RAM, ROM, and external memory storage such as hard drives, floppy drives, optical storage, and other suitable memory storage devices. The memory 154 includes an OS module 156 and a server module 158 that perform server functions in a conventional manner. A single module can execute the OS module 156 and the server module 158.

In general, the web server 14 interfaces with the user of the computer 26 using hypertext markup language (HTML). The user selects a uniform resource locator (URL) for the web server 14. The computer 26 sends the URL request to the web server 14 using hypertext transfer protocol (HTTP). The web server 14 finds a requested home page, document, or object (such as an executable file) and sends it to the computer 26. When the request is complete, the HTTP connection is closed and can be reopened later if needed. Web pages and executable files 162 are transmitted to the computer 26 in response to the requests.

One or more I/O devices 166 such as a keyboard, a mouse, a printer, a scanner, etc. are connected to the I/O interface 150. A display 170 is connected to the I/O interface 150. The web server 14 is connected to the distributed communications system 18 using a phone-based or cable-based modem 174, a LAN 176, a WAN 178, or other suitable connections. Radio frequency and/or satellite-based connections are also contemplated. One or more databases 182 contain a master title library that includes digital audio files for each song that is to be delivered in the continuous play background media system 10. The databases 182 further include custom and generic announcement files, video files and text/graphics files that are likewise to be distributed in the continuous play background media system 10. The databases 182 also contain user profiles that are associated with one or more users and one or more playback control devices 30. The databases 182 store logs containing a list of music, announcements, video and text/graphics that have been used by the playback control devices 30 for customer billing and royalty payment purposes. As can be appreciated, the databases 182 can be separated into multiple databases on one or more computers as is dictated by database size, access speed, security and other factors.

In use, the computer 26 uses the browser 56 to connect to the web server 14 via the Internet 18. The web server 14 transmits a web page containing a user name and password interface. Alternately, an executable file can perform the user name and password log-on process. Using the computer 26, the user designs a continuous play program for one or more playback control devices 30. Upon completing the continuous play program, the web server 14 begins a process of updating the playback control devices 30 using one or more connection sessions.

As can be appreciated, the computer 26 can be located remotely from the playback control devices 30 and can program multiple playback control devices 30 at once. Alternately, the computer 26 and the playback control device 30 can be integrated into a signal device. In other words, the computer 26 can be used as described above. When not used to create or modify continuous play programs, the computer 26 can be used as a playback device. By providing a distributed control system for continuous play background media systems 10, franchise owners can create a more uniform experience for their commercial environments. In addition, local management does not need to be involved with the creation or modification of the continuous play programs. Nonetheless, the continuous play programs according to the invention are almost infinitely variable unlike conventional systems.

Referring now to FIG. 5, the computer 26 includes the internet browser 56 that includes a control screen 200. The Internet browser control screen 200 includes a menu bar 204 with one or more drop-down menus that are operated in a conventional point-and-click manner. A toolbar 208 contains a plurality of command buttons 210 which provide browsing functions such as back, forward, stop, refresh, print, home, search, favorites, and other suitable browser functions. An address text box 212 allows a user to input a URL or domain name address for connecting the computer 26 to a web page provided by the web server 14.

A log-on interface 216 requires the user to input a user name in a text box 222 and a password in a text box 224. When complete, the user clicks on a command button 226 to attempt to log on. The web server 14 compares the user name and password to a database. If a match is found, the user is granted access. After a user is logged on, the command button 216 may also be used to log-off the user. The text of the command button 26 is changed to "log off." The user name and password provide the user access to modify or create continuous play programs. Access levels vary depending upon the password clearance of the user.

After logging on, the web server transmits a location interface 234 (FIG. 6) that is provided by one or more location-related executable files. The location interface 234 allows a user to classify locations into groups and subgroups so that a continuous play program can be created for a location, a subgroup of locations, or a group of subgroups. Additional grouping levels can be added if needed. The location interface 234 includes an interactive box 236 that contains groups, subgroups and locations that can be accessed by the user. The interactive box 236 provides the user with a list of locations, groups and subgroups and other related data fields from the database 182. The groups, subgroups, locations, addresses, and other data fields are stored in one or more relational tables in the database 182. As used herein, the term "interactive box" refers to display boxes that contain automatic links for the databases 182, dynamic displays such as trees, or lists that can be sorted by clicking on field names, by using check boxes, or by moving scroll bars.

The interactive box 236 is manipulated using a scroll bar 240 in a conventional manner. By clicking on one of the column headers 244-1, 244-2, 244-3, the location interface 234 sorts the data by the selected header. For example, if the subgroup filed name 244-2 is selected, the group, subgroup and location information is arranged alphabetically by subgroup initially from A to Z. Selecting the subgroup field name again sorts from Z to A.

An interactive text box 250 includes a tree structure 254 that can be expanded and collapsed to show a location hierarchy that is defined by the user. Additional command buttons generally identified at 258 and a check box at 262 allow a user to organize locations into groups and subgroups by showing, hiding, selecting and/or clearing. Command button 264 triggers a dialog box (not shown) which allows a new location to be added. An "edit location" command button 266 triggers a dialog box (not shown) that allows a location to be edited.

The group or subgroup of a location can be changed by highlighting a location in the interactive box 236 and a group or subgroup in the interactive box 250. By clicking on a command button 268, the selected group or subgroup is updated for the selected location. To modify a group, the user selects a group, subgroup or location by highlighting the group, subgroup or location. The user clicks on a command button 264. The command button 264 selects the highlighted group, subgroup or location and returns the user to the log-on interface 216. From there, the user can make modifications to the selected group, subgroup or location using the links. In an alternative configuration, a system administrator may arrange predetermined groups for selection by the users, limiting the user's ability to define groups. Such modification may be selected from a menu of options such as links 228 shown in FIG. 5. The user can click on various different links 228 that allow the user to change various aspects of continuous play programs associated with the user.

Figure 7:
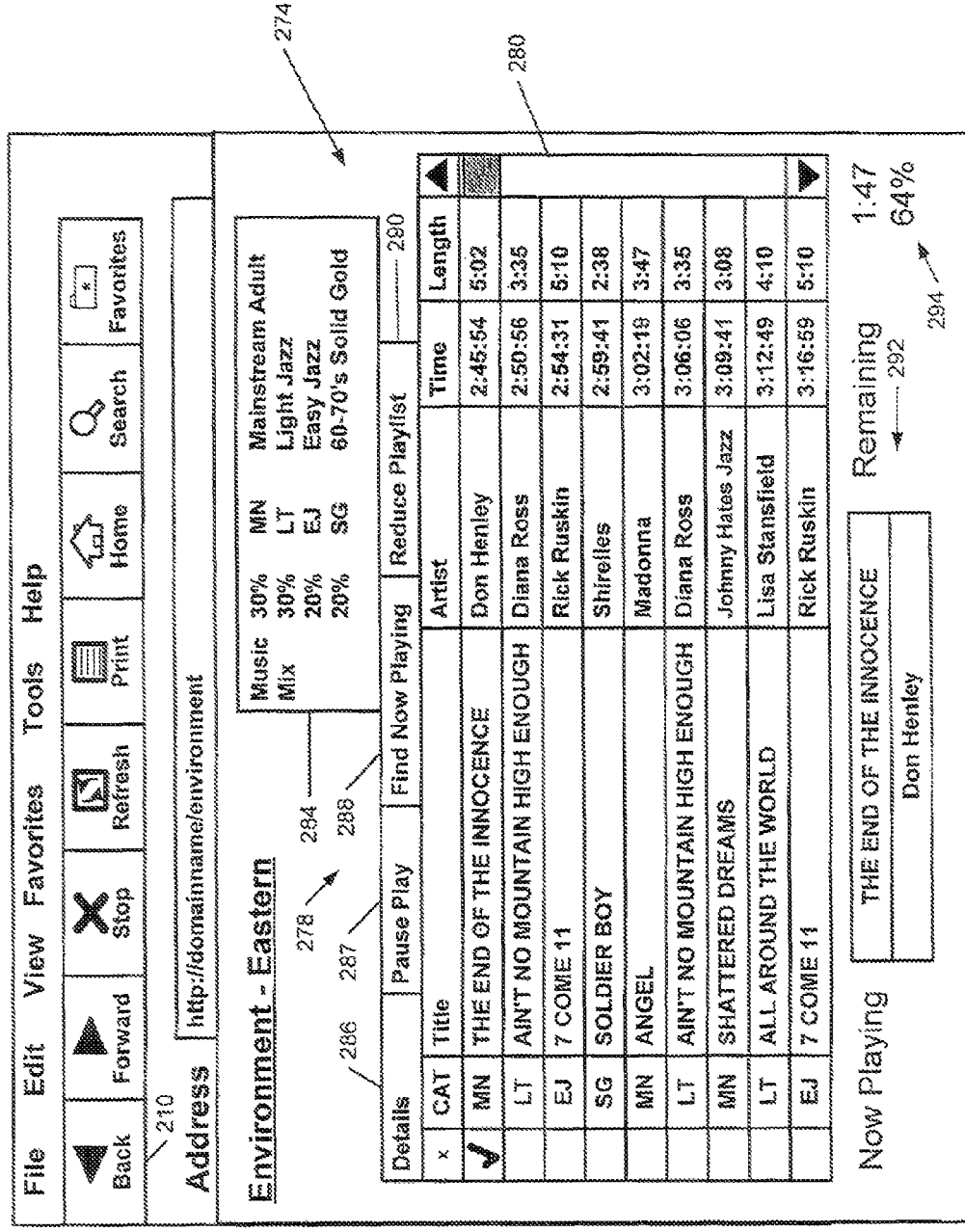
FIG. 7 illustrates an environment interface for the continuous play background media system.

Referring now to FIG. 7, when the user clicks on an environment link 270 in FIG. 5, one or more environment-related executable files are transmitted by the web server 14 to the computer 26. An environment interface 274 displays a current playlist that may include one or more collections for a selected group. For example, the Eastern group is selected in FIG. 7. The user previously selected the Eastern group using the location interface 234. The environment interface 274 shows the playlist that contains selections that are currently playing or in a cue to be played at the Eastern group. A "live" connection between at least one of the play back control devices in the Eastern group is required. If a "live" link is not available, the environment interface would be limited to showing the collection currently being played.

An interactive box 278 includes a scroll bar 280 for scrolling through individual selections. The information displayed on the interactive box 278 is automatically accessed from the database 182 and includes title, artist, time, length, and a category. Highlighting is employed to identify a currently playing selection. A text box 284 includes information concerning a collection that is currently playing at the Eastern group locations. The collection includes a plurality of collection components each of that is allocated a percentage of a collection. For example, the Mainstream Adult Collection Component is 30% of the collection. Selections from each of the collection components are preferably played at random (unless modified) in proportion to the allocated percentage or restricted by date or time. To return to the log-on interface 216, the back tool button 210 can be used. Alternately, a command button can be provided to return the user to the log-on interface. A details command button 286 provides details concerning the collection, the selection currently playing, the locations within the selected group, and other pertinent information. A pause play button 287 pauses play at the selected locations. A command button 288 locates a currently playing selection. A reduce playlist button 290 launches a dialog box (not shown) that reduces the length of the playlist for the collection.

Figure 8:
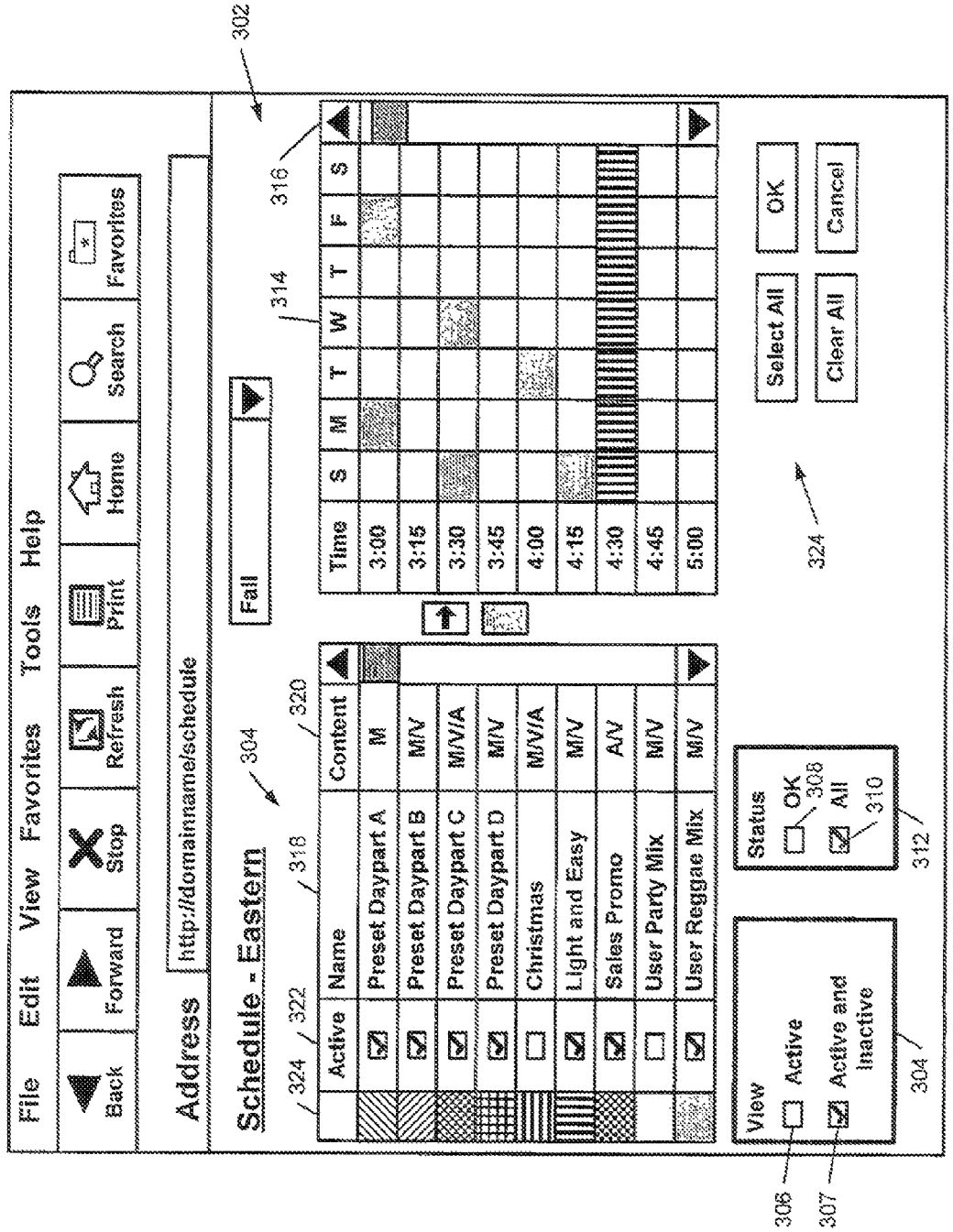
FIG. 8 illustrates a schedule interface for the continuous play background media system.

Referring now to FIG. 8, a schedule link 300 in FIG. 5 causes the web server 14 to transmit one or more schedule-related executable files. A schedule interface 302 allows a user to assign collections that are predefined by the operator of the continuous play background media system 10 operator such as 60-70's Solid Gold, Core Country, Adult Contemporary, etc. to a time-based schedule for the selected groups, subgroups or locations. The schedule interface 302 also allows the user to assign user-defined collections to the time-based schedule for the selected groups, subgroups or locations. A frame 304 allows a user to select either active or active and inactive collections using check boxes 306 and 307. By excluding inactive collections, seasonal collections such as Christmas collections can be omitted to provide a cleaner display. A second group of check boxes 308 and 310 are located in a frame 312 and allow a user to select collections with an "OK" status or an "ALL" status. The "OK" status designates that all components of the collection are loaded on the system. The database names of all available selections are always available. The selections such as audio, video, or announcement files may not be loaded on the playback control devices. The "ALL" status designates that some of the components may be missing from the system.

To assign collections to the time-based schedule, the user selects one or more time slots in an interactive box 314 that includes days of the week and time of day. The time of day portion is divided into time blocks having a predetermined time increment such as 15, 30, 45, 60, etc. minutes. A scroll bar 316 allows the user to change the time blocks that are displayed. An interactive text box 318 contains collections that are available to the user along with other related data fields such as a content field 320 and a status field 322. The content field 320 identifies the type of media that is contained in the collection. A color-coded field 324 is used in the interactive box 314 to graphically represent the collections in the time blocks.

In use, the user selects a collection from the interactive box 318. The user highlights one or more time blocks in the interactive box 314. The user points and clicks on a command button 316. The selected collection is assigned to the selected time blocks. The time slots that are provided in the text interactive box 314 must be filled completely to prevent the unintentional absence of selections (such as music, announcements, or video) during business hours. Silence, however, may be intentionally programmed into time blocks. Command buttons, generally identified at 324, allow a user to cancel changes, approve changes, select all boxes, or clear all boxes.

Color-coding or texture-coding may be employed to provide an easy key for a user who is viewing the time blocks. The continuous play program fits selections within a designated time block. A selection from a selected collection that is assigned to a time block may run over an end time for the block if the selection does not happen to end precisely at the end of the time block. Generally a two-minute rule is used. Selections are inserted until one of the selections ends within +/−2 minutes of a time block end period.

Figure 9:
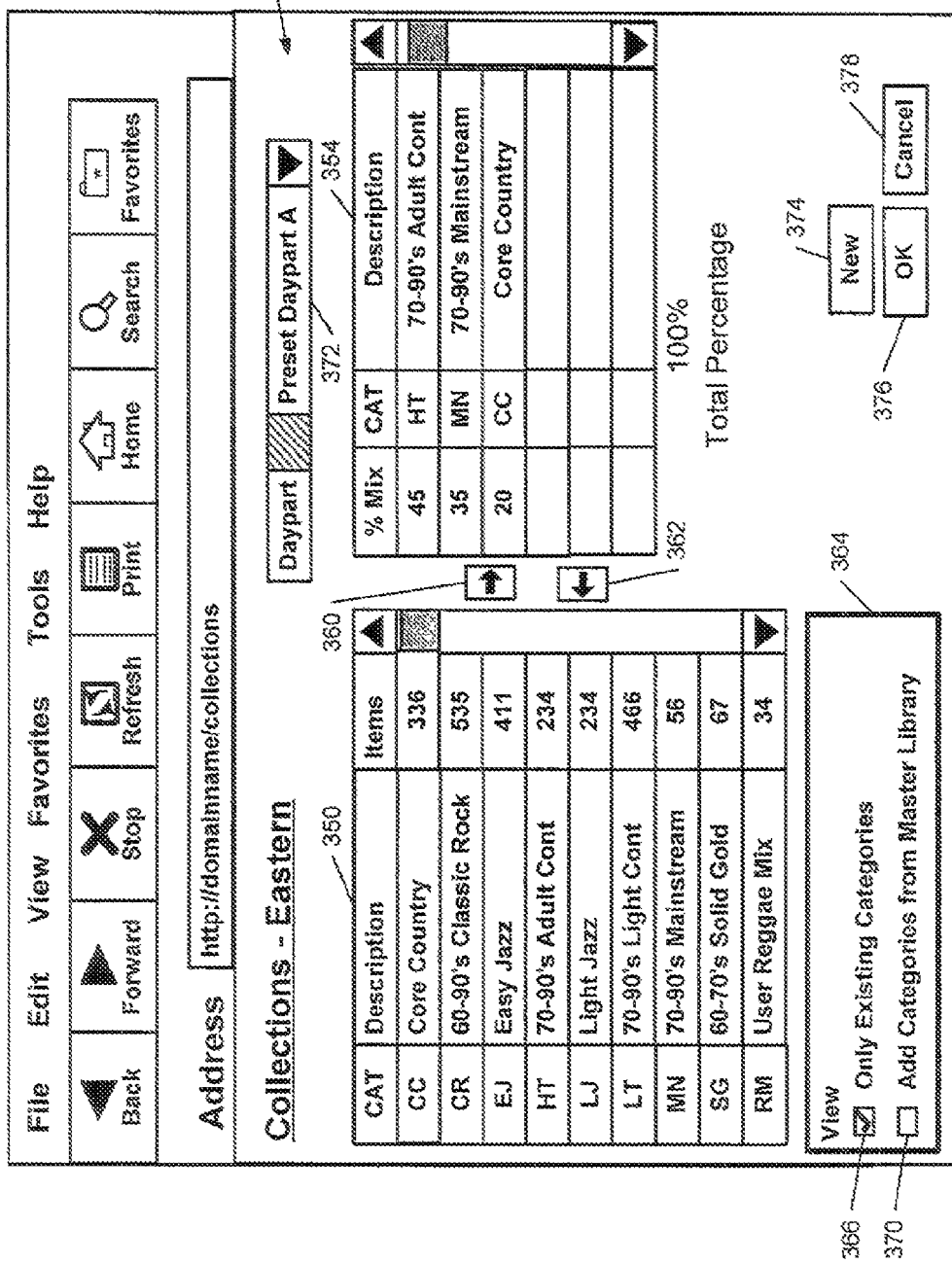
FIG. 9 illustrates a collections interface for the continuous play background media system.

Referring now to FIG. 9, when a user actuates a collections link 340, the web server 14 transmits one or more collections-related executable files. A collections interface screen 344 allows a user to modify existing collections or to create a new collection. An interactive box 350 lists predefined and user-defined collections that are available to the user. An interactive box 354 allows a user to modify collection components and to change percentages that are allocated to each collection component within an existing user-defined collection.

In use, the user highlights one of the collections and presses a command button 360 to add the collection component to the collection. The user highlights a collection component and clicks a command box 362 to remove the collection component from the collection. The user enters a desired percentage for each collection component in the interactive box 354. A frame 364 allows a user to select from existing categories that the user has access to or categories from the master library using check boxes 366 and 370. A drop-down list box 372 allows a user to select from existing collections. A command button 374 allows a new collection name to be added to the drop down list 372. Command buttons 376 and 378 allow a user to approve or cancel changes, respectively.

Figure 10:
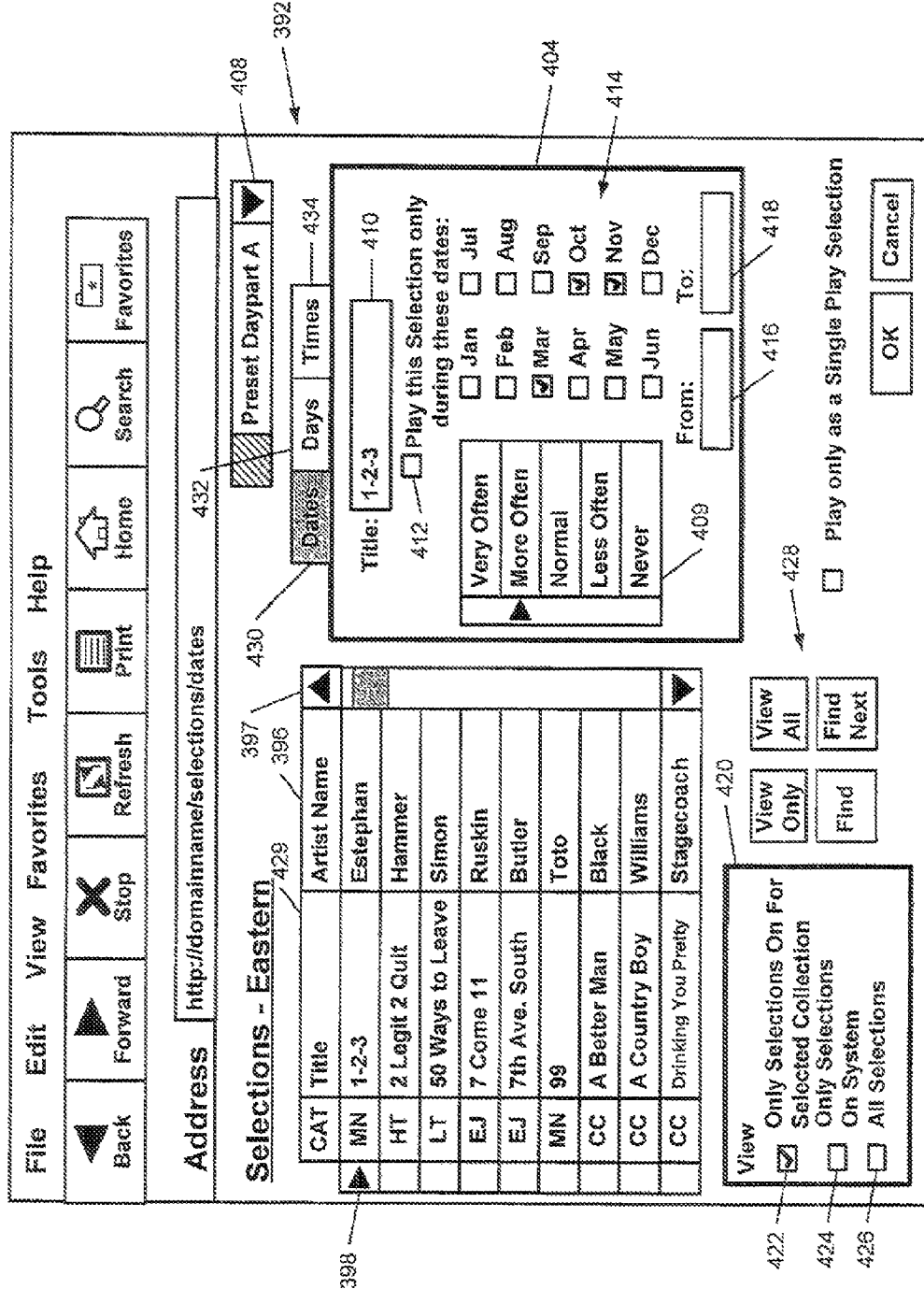
FIG. 10 illustrates a date selection interface for the continuous play background media system.

Referring now to FIG. 10, selection link 390 from FIG. 5 triggers the web server 14 to transmit one or more selection-related executable files that include a selection interface 392. The selection interface 392 allows the user to control the frequency of songs within user-defined collections. An interactive box 396 lists songs for a selected user-defined collection and includes a slider bar 397 for navigating selections. An arrow icon 398 identifies a currently selected title. An interactive box 404 contains check boxes, text boxes and a slider bar that allow a user to adjust a relative frequency at which a selection is played in an existing collection that is selected by a drop-down list box 408. A slider control 409 slides between a setting that plays a selection very often relative to other selections in a collection and a setting that never plays a selection. Using check boxes 412 and 414, the selection can be played only during certain months by selecting the month using one or more check boxes 414. Text boxes 416 and 418 can be used for selecting specific date ranges for consecutive months. A frame 420 and check boxes 422, 424 and 426 control which selections are listed in the text box 396. Check box 422 limits selections to a selected collection. Check box 424 limits selections to those that the user has access to. Check box 426 allows all selections to be selected. Command buttons 428 launch dialog boxes that allow the selections to be searched and filtered in a conventional manner. Field names 429 of the interactive box 396 allow the user to sort by category, title, artist name, or other fields by pointing and clicking on the field names 429. Control buttons 430, 432, and 434 allow a user to control play on a monthly basis (date button 430), a daily basis (days button 432) and an hourly basis (time button 434).

Figure 11:
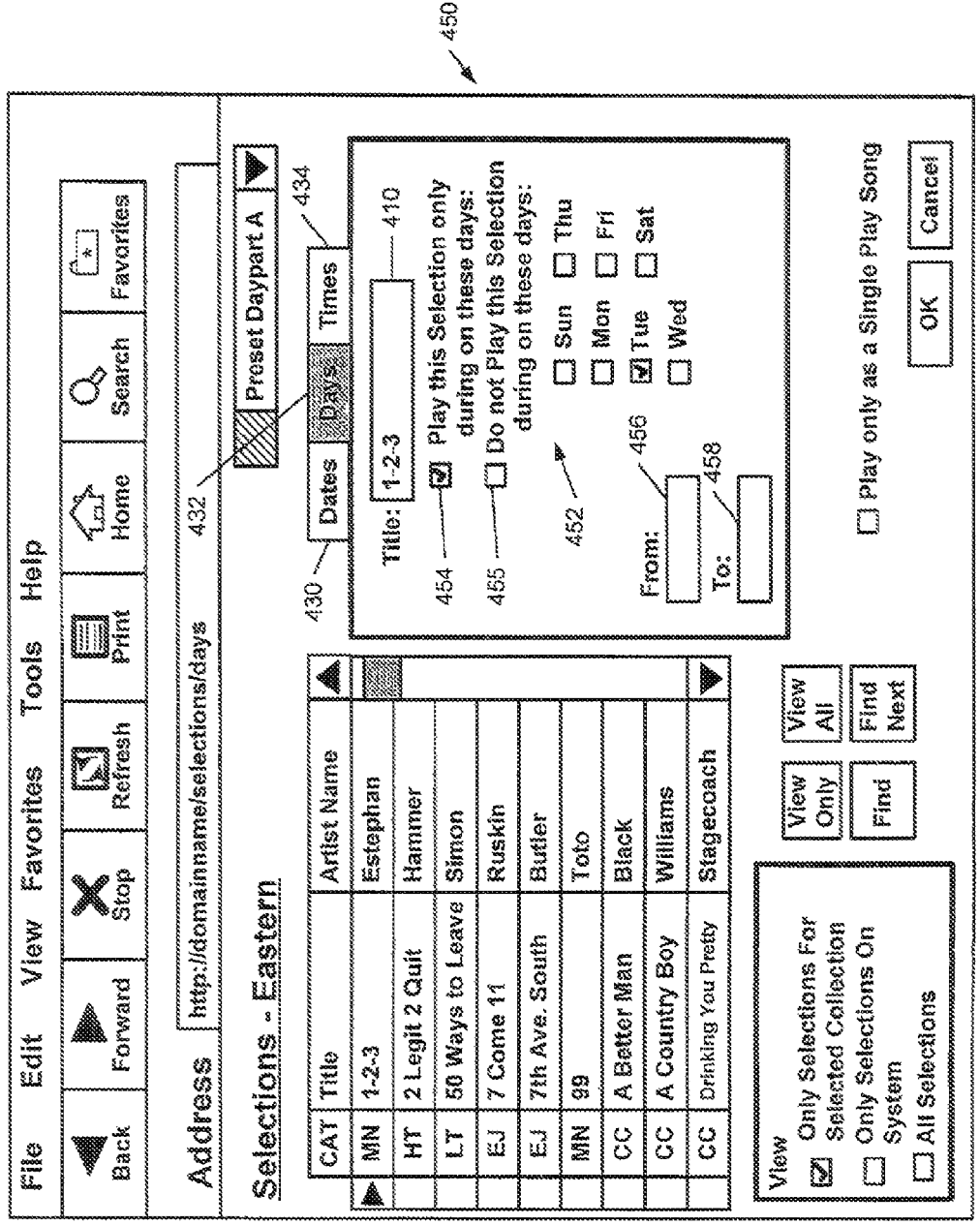
FIG. 11 illustrates a day selection interface for the continuous play background media system.

Referring now to FIG. 11, particular days for playing a selection also be programmed by selecting the command button 432. One or more selection-related executable files provide an interface screen 450 that contains check boxes 452, 454, and 455 that are used to select songs to be played on certain days of the week. Alternately, drop-down list boxes 456 and 458 allow the selection of consecutive days for playing the song.

Figure 12:
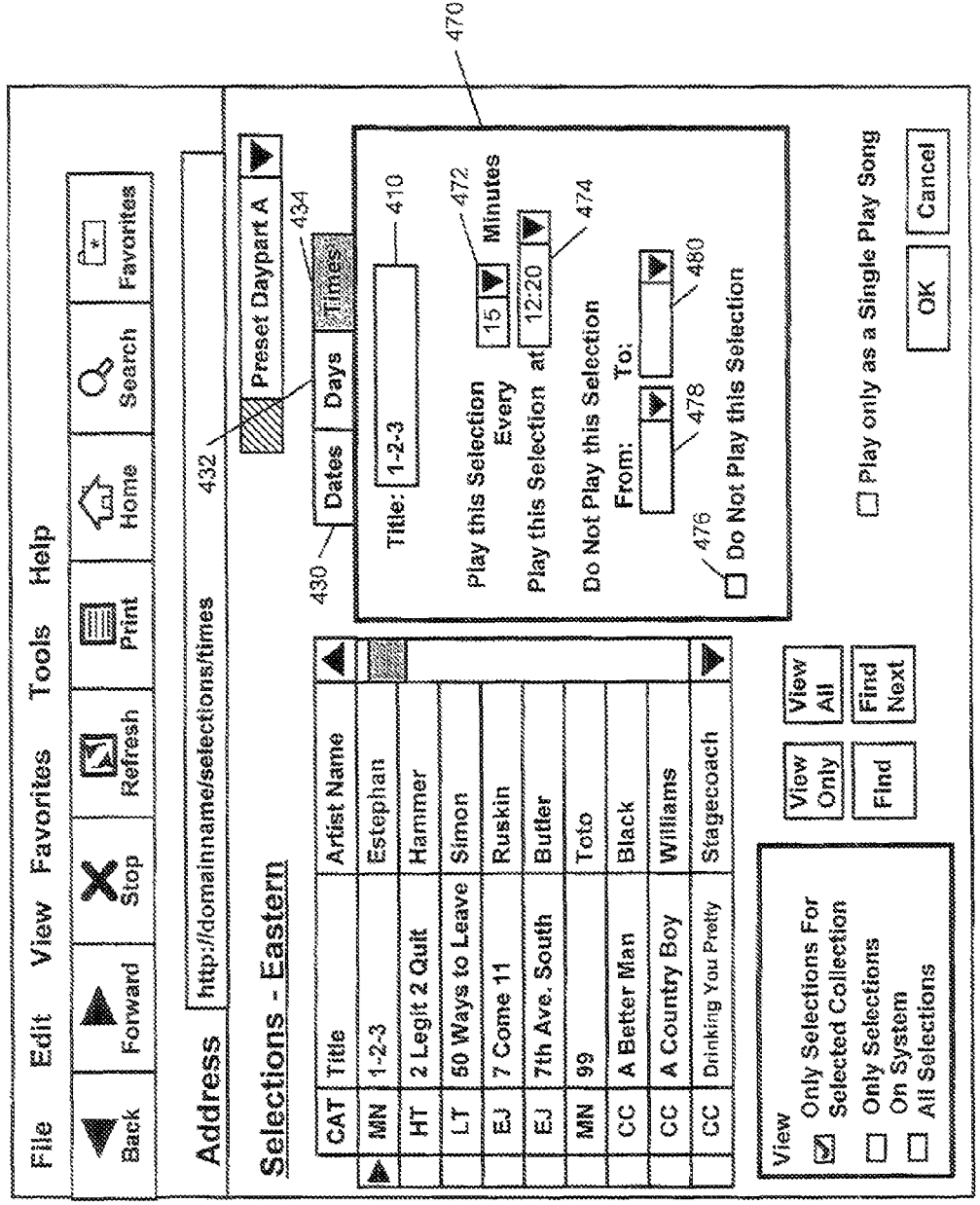
FIG. 12 illustrates a time selection interface for the continuous play background media system.

Referring to FIG. 12, when the user selects the button 434, an interactive box 470 is provided by one or more selection-related executable files. The interactive box 470 allows the user to play a selection periodically using a drop-down box 472. The interactive box 470 allows the user to play a selection at a particular time using a drop-down box 474. The interactive box 470 allows a user to prevent a selection from playing using a check box 476. First and second drop-down boxes 478 and 480 allow a user to prevent the selection from being played between first and second time periods.

Figure 13:
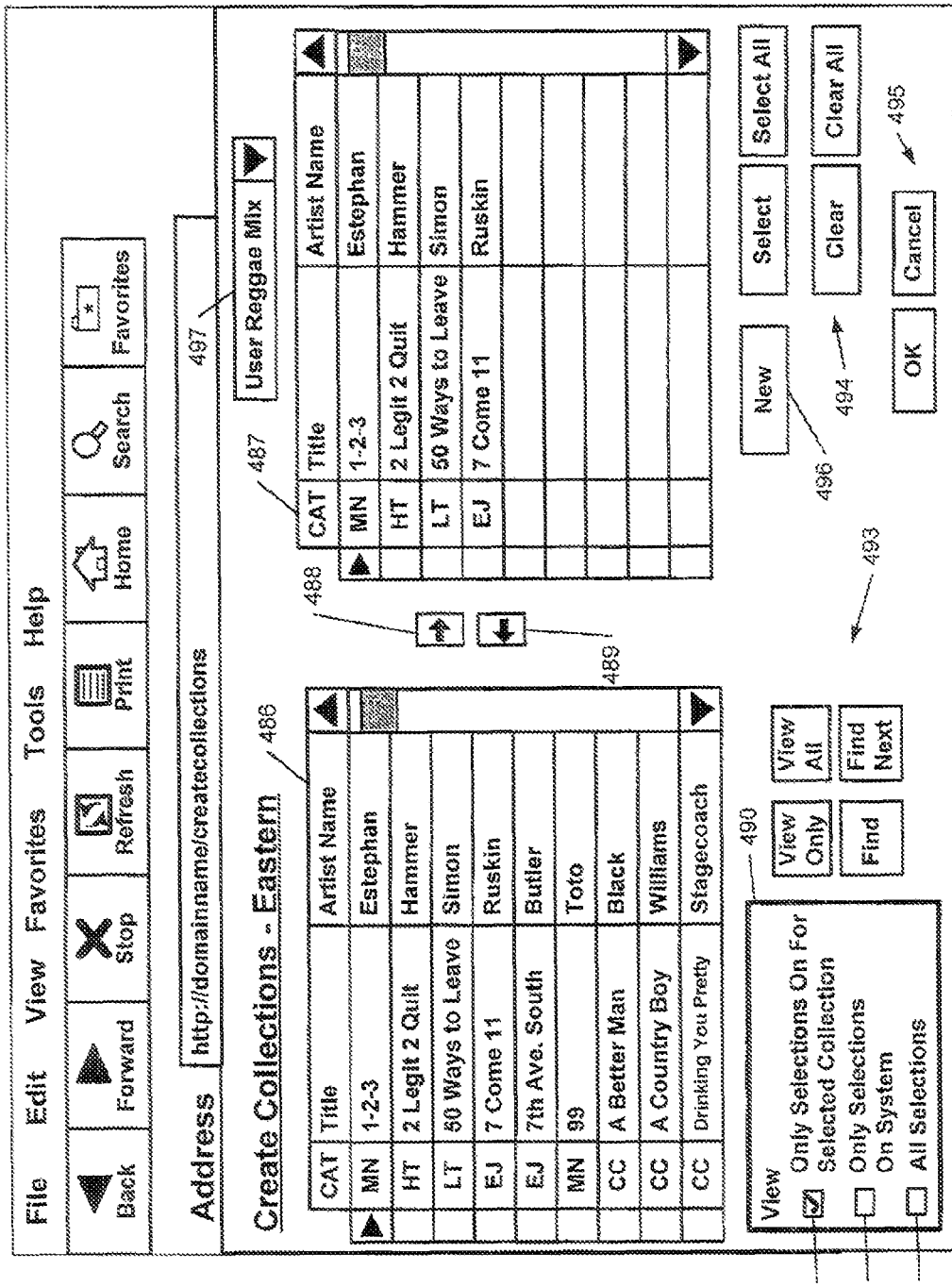
FIG. 13 illustrates a create collections interface for the continuous play background media system.

Referring now to FIG. 13, a create collections link 484 triggers the web server 14 to transmit one or more create collections-related executable files. A create collections interface 485 includes an interactive box 486 that contains a list of available selections and has functionality similar to the interactive box 396.

An interactive box 487 contains selections chosen from the list in the interactive box 486. The user selects one or more selections in the interactive box 486 and clicks command button 488 to add selections to the new collection. The user selects one or more selections in the interactive box 487 and clicks command button 489 to remove the selections from the collection. A frame 490 contains check boxes 491-1, 491-2 and 491-3 that are used to choose all selections on the system or those currently available to the user. Command buttons 493 assist the user in finding selections within the list provided in the interactive box. Command buttons 494 allow the user to select, clear, select all or clear all. Command buttons 495 allow the changes to be cancelled or approved. Command button 496 allows a new collection to be added to a drop-down list box 497. The drop-down list box 497 allows the user to select other user-defined collections for modifications.

Figure 14:
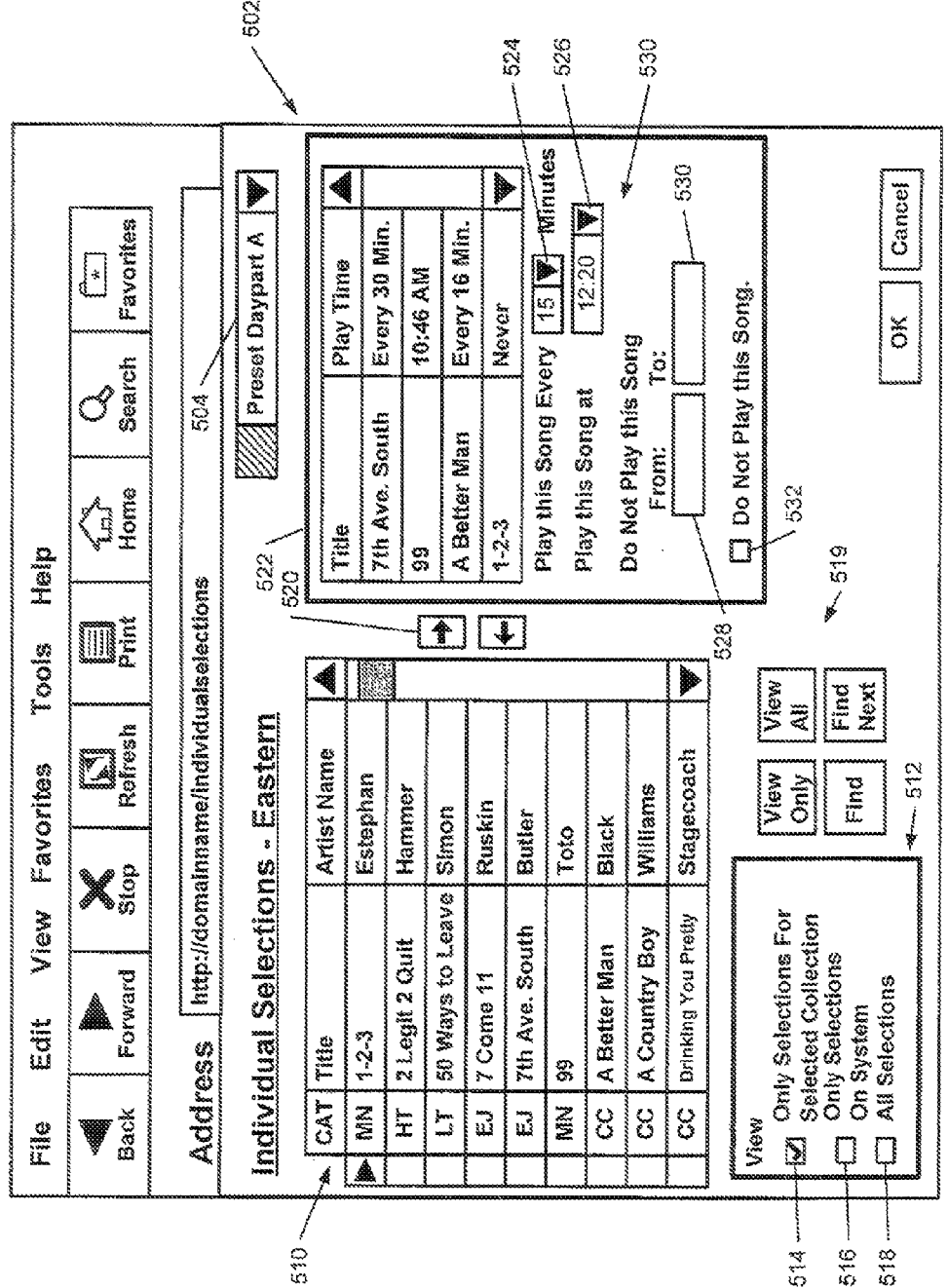
FIG. 14 illustrates an individual selections interface for the continuous play background media system.

Referring now to FIG. 14, when a user selects an individual selections link 500 in FIG. 5, the web browser 14 transmits one or more executable files to the computer 26. The executable files allow the user to program individual selections such as audio, video, and announcements to play at certain intervals or to not play at all. The individual items are scheduled initially then selections from a selected collection randomly (with or without weightings) fill a playlist. The executable files contain an individual selections interface 502 that includes a drop-down list box 504 which can be used to choose selections from a predefined collection for output to an interactive box 510. Alternately, a frame 512 includes check boxes 514, 516, and 518 that limit the selections provided in a text box window 510. The check boxes 514, 516, and 518 limit selections output to the interactive box 510 to the collection that is selected using the drop-down list box 514. The check box 518 allows all selections in the master library to be presented. The check box 516 allows only selection in collections that are currently associated with the computer 26 to be output. Command buttons, generally designated 519, launch dialog boxes for sorting and finding selections within the list of selections in interactive box 510. The user selects the selections in the text box 510 using the mouse and/or keyboard. An arrow 520 adds the selection to a list in an interactive box 522 that lists other automatic selections. The user can select the frequency of play using a drop-down list box 524. The user can select play at a specific time using the drop-down list box 526. Drop-down list boxes 528 and 530 prevent the selection from playing between two times. A check box 532 prevents a selection from playing.

Figure 15:
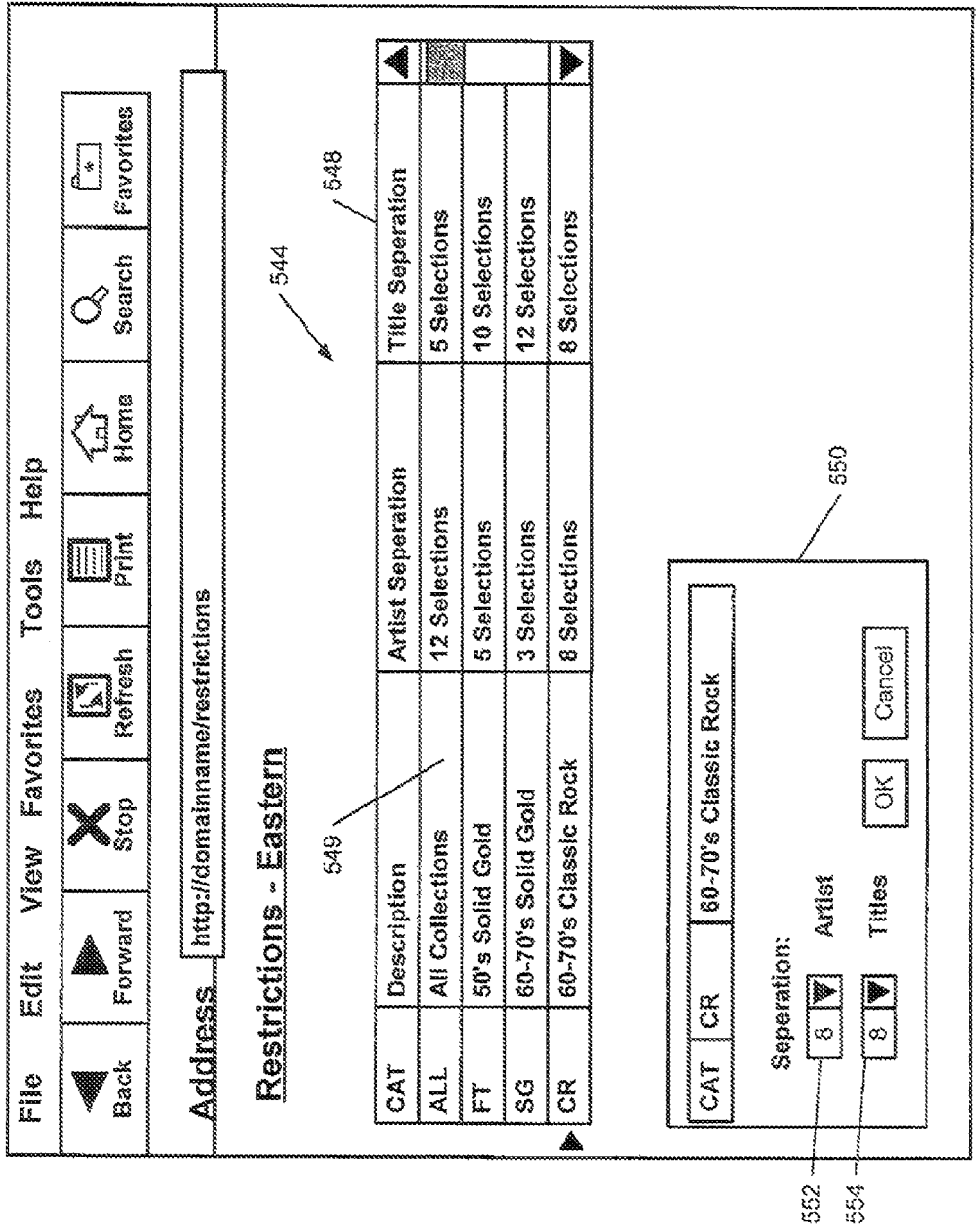
FIG. 15 illustrates a restrictions interface for the continuous play background media system.

Referring now to FIG. 15, when a user selects a restrictions link 540 in FIG. 5, a restrictions interface screen 544 is provided by the web server using one or more executable files. An interactive box 548 lists all of the collections currently associated with the computer. A global setting 549 sets a default artist separation between selections and/or file separation between selections. The global settings are used by default unless a specific restriction setting applies. By double clicking on a line, an interactive box 550 is launched which allows a user to define a separation between selections by a particular artist using a drop-down list box 552, or a separation between selections having the same title using a drop-down list box 554.

Figure 16:
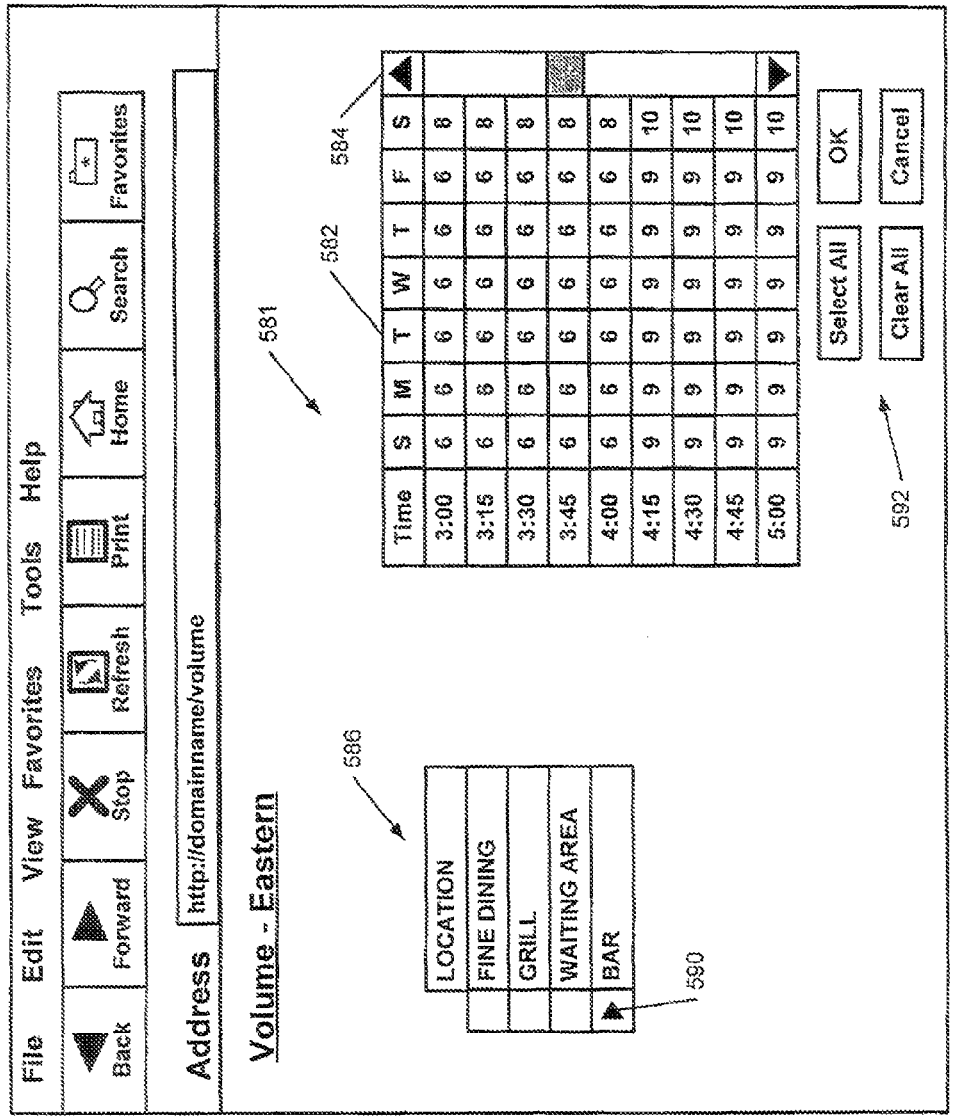
FIG. 16 illustrates a volume interface for the continuous play background media system.

Referring now to FIG. 16, a playback volume link 580 in FIG. 5 triggers the web server to transmit one or more volume-related executable files. A playback volume interface screen 581 includes an interactive box 582 that displays volume levels as a function of day and time. A slider bar 584 allows navigation of time. Time blocks are defined based upon default settings. An area selection box 586 allows the selection of one of a plurality of areas within the commercial facility using the mouse an arrow 590. For example in FIG. 15, a bar area is selected. The volume levels for the bar area are displayed in the interactive box 582. In a similar manner, lights and heating, ventilation and air conditioning (HVAC) can be controlled. Command buttons 592 allow selection, clearing, approval and cancellation of changes. The volume levels are set either as a percentage of full volume or as a relative level above ambient noise. In such a case, I/O device 94 of the playback device 30 is an ambient noise sensor.

Figure 17:
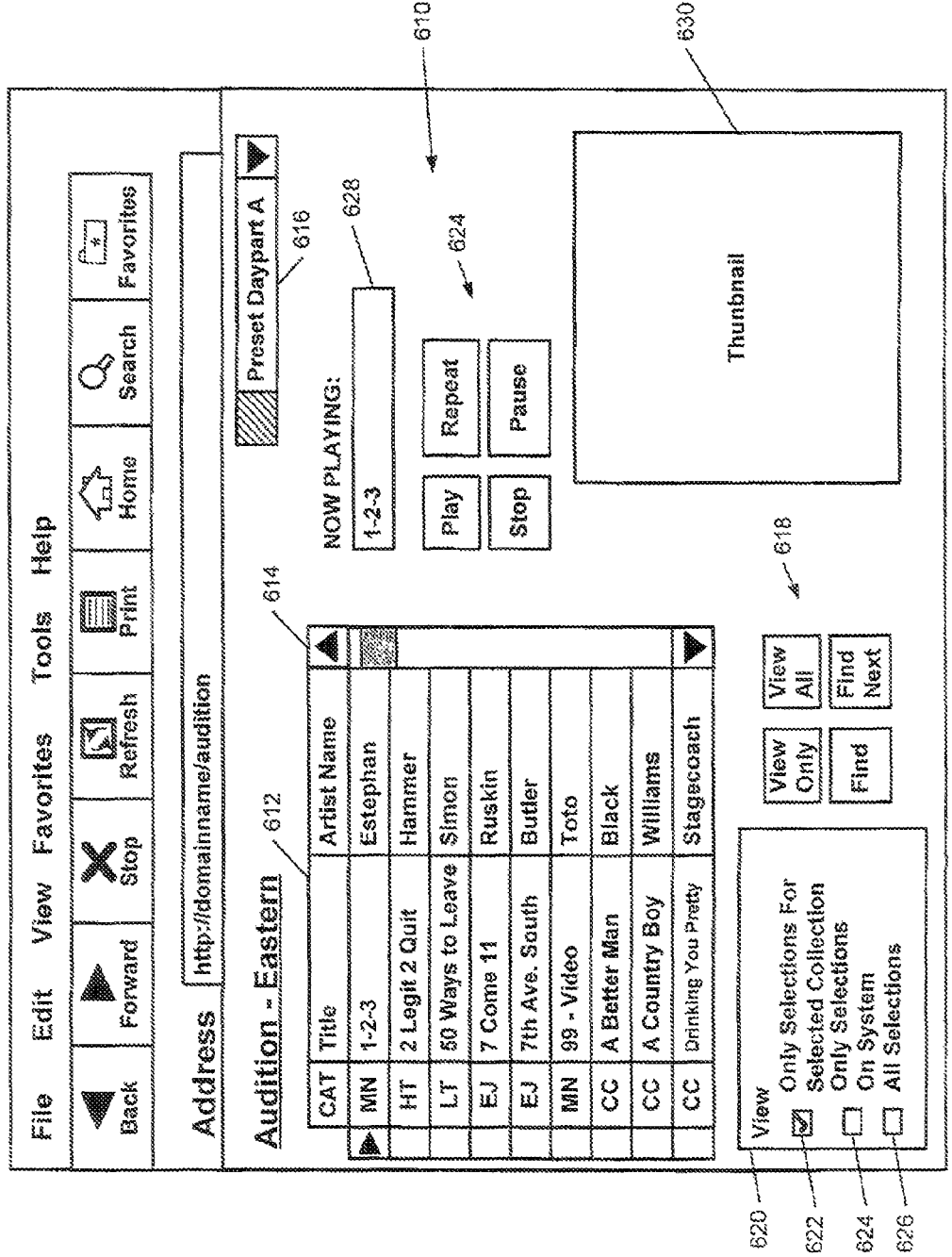
FIG. 17 illustrates an audition interface for the continuous play background media system.

Referring now to FIG. 17, an audition link 600 in FIG. 5 triggers the web server 14 to download one or more audition-related executable files. An audition interface 610 includes an interactive box 612 that includes a list of selections available. A slider bar 614 allows the user to view the list. A drop-down list box 616 allows the selection of predefined or user-defined collections. One or more command buttons 618 allow selections to be found using search and filter functions. An interactive box 620 allows filtering of the list using check boxes 622, 624, and 626. Check box 622 limits selections to those in the collection selected in the list box 616. Check box 624 limits selections to those currently available to the user. Check box 626 provides all available selections.

A user selects a particular selection using the slider bar 614 if needed and clicking on a particular selection. The title of the selection appears in a text box 628. A thumbnail view 630 appears if the selection includes video. Command buttons 624 allow the user to play, stop, repeat and pause a particular selection in a conventional manner. When used, the audition interface 610 does not impact the continuous play program that is operating at the selected locations, subgroup or group. The web server 14 preferably delivers the particular selection to be auditioned using streaming audio, streaming video, or other suitable techniques.

Figure 18:
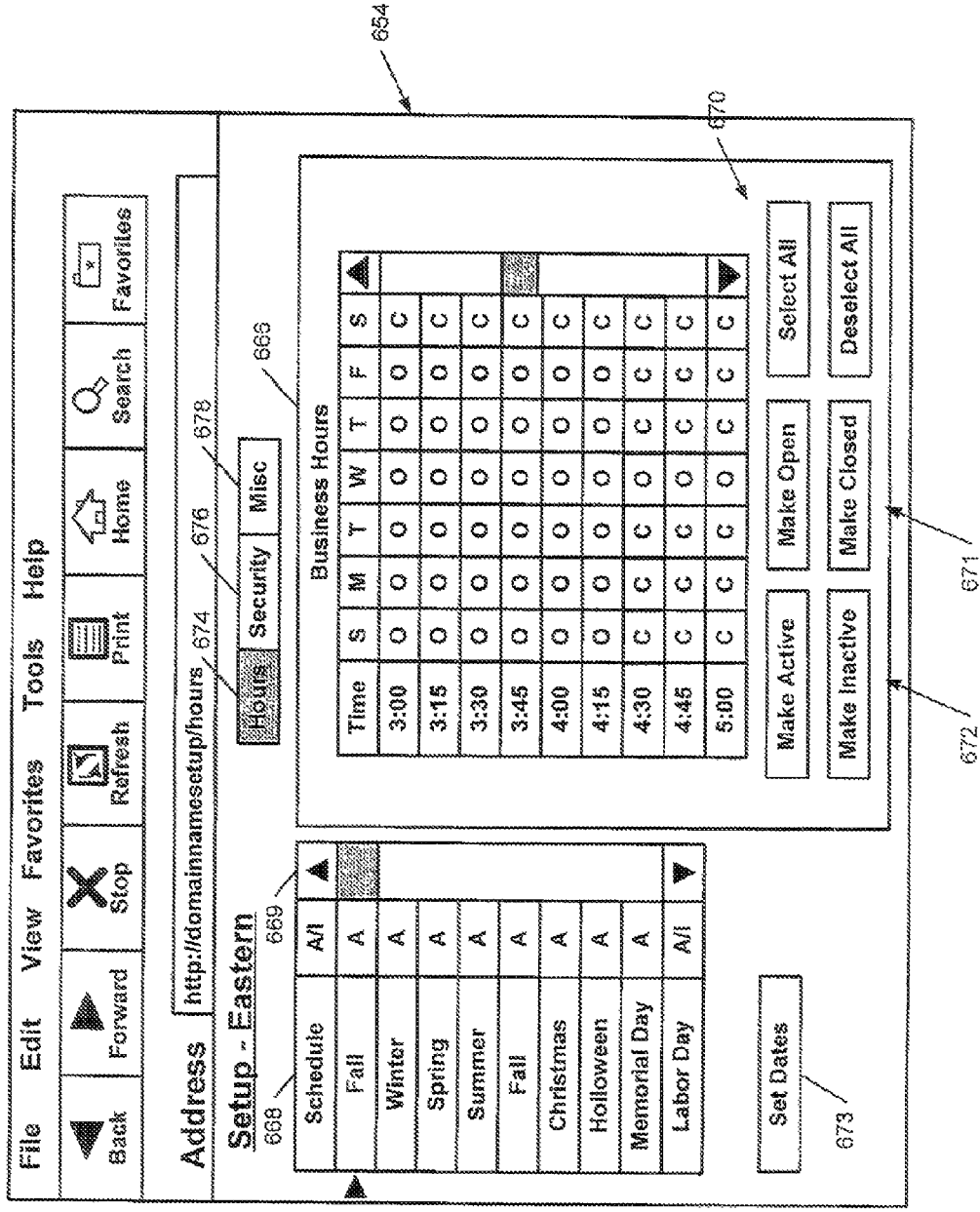
FIG. 18 illustrates an hours setup interface for the continuous play background media system.

Referring now to FIG. 18, when a user clicks a set-up link 650 in FIG. 5, the web server 14 transmits one or more setup-related executable files. An hours set-up interface screen 654 provides an interactive box 666 which contains a grid defining hours of operation for the selected locations. An interactive box 668 lists available schedules and an active or inactive status. A slider bar 669 allows a user to navigate the list in the interactive box 668. Different days of the week or times of the year have different opening and closing hours. Command buttons 670 allow a user to select and deselect days and times. Command buttons 671 allow a user to make selected times open or closed. Command buttons 672 allow a user to change the status of a selected schedule name from active to inactive. Alternately, the user can double click on a particular day and time to change the day and time from open to closed or from closed to open. Specific dates for a schedule can be set using a command button 673 that launches a dialog box. Command buttons 674, 676 and 678 allow a user to navigate to other set-up screens.

Figure 19:
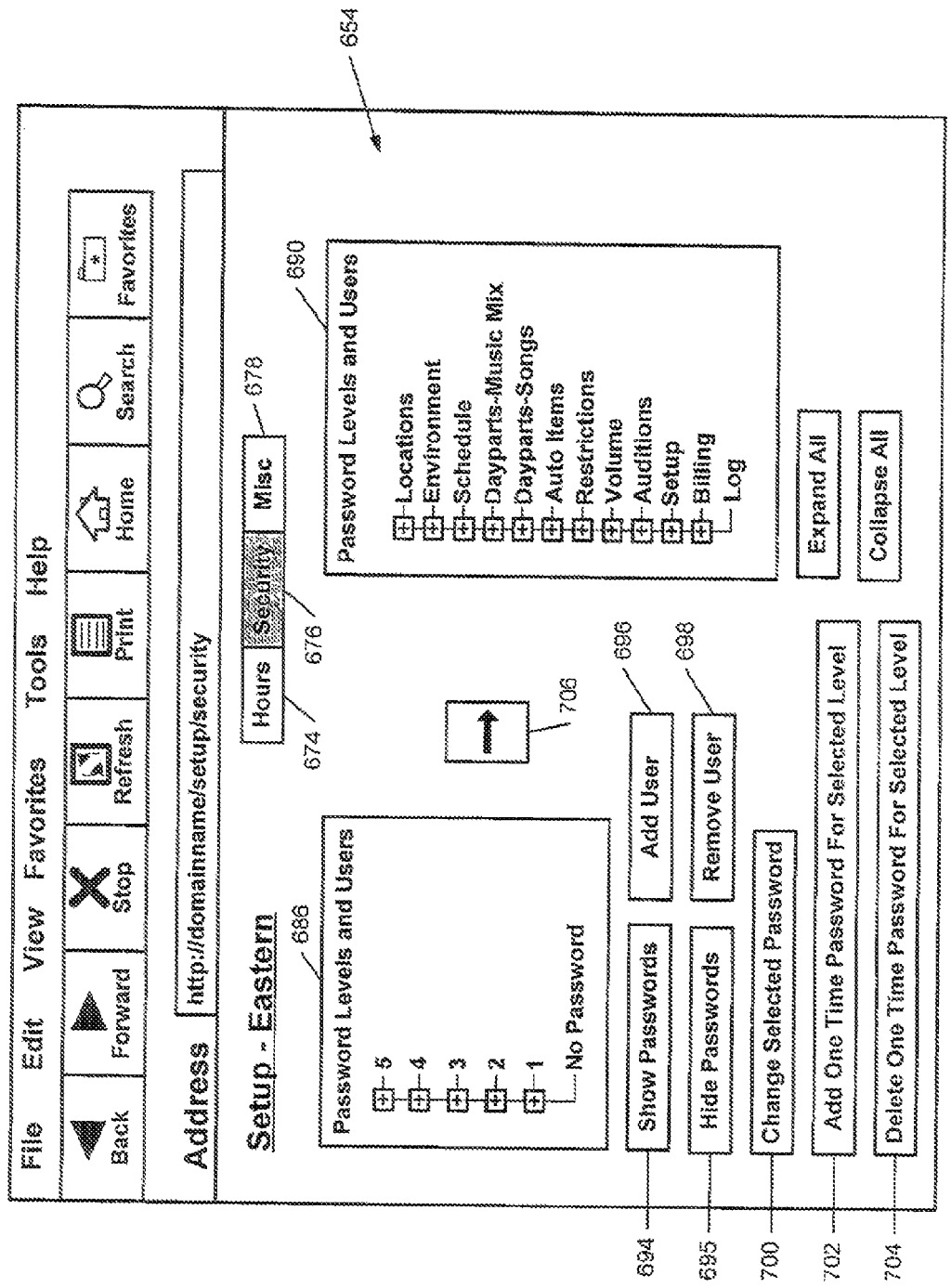
FIG. 19 illustrates a security setup interface for the continuous play background media system.

Referring now to FIG. 19, the command button 676 of the set-up interface 654 allows a user to define password levels if the user has a sufficiently high security level. An interactive box 686 displays password levels in a tree structure. If a particular user has a sufficiently high security level, such as level 5, the user can assign access levels to other users for one or more of the interface screens that are listed in an interactive box 690. Command buttons 694 and 695 allow a user to show or hide passwords in the tree structure. Command buttons 696 and 698 allow a user to be added or removed. A command button 700 allows a password to be changed. A command button 702 allows a one-time password to be selected for a level. A command button 704 allows a user to delete a one-time password for a level. A command button 706 allows a highlighted user or security level in the interactive box 686 to be assigned access to the interface screens that are highlighted in the interactive box 6790.

Figure 20:
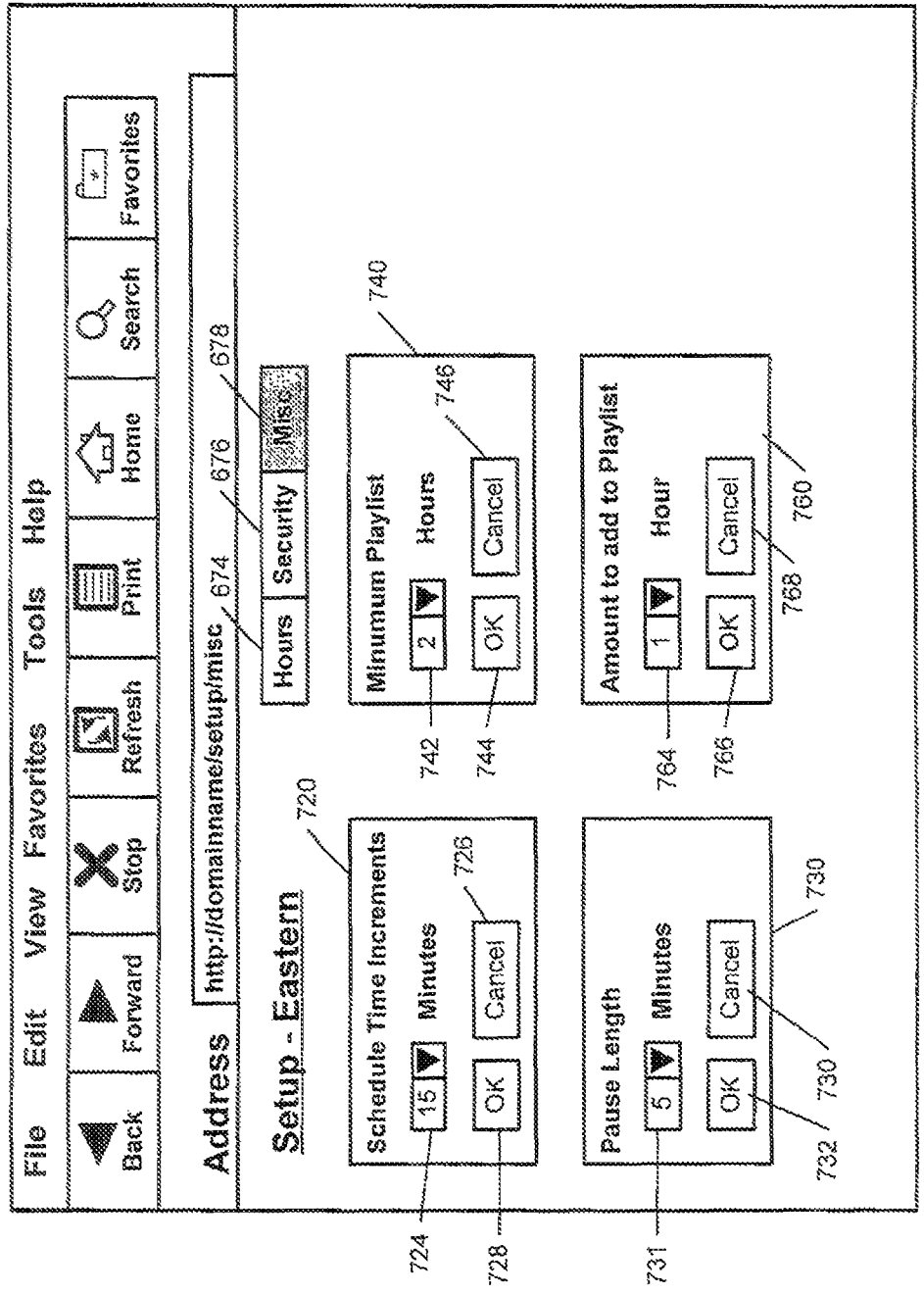
FIG. 20 illustrates a miscellaneous setup interface for the continuous play background media system.

Referring now to FIG. 20, default set-up settings can be set for the system by selecting the command button 678. A frame 720 contains a drop-down list 724 which allows a time increment for scheduling. Command buttons 726 and 728 allow a user to cancel or approve a change. A frame 730 contains a drop-down list 731 that allows a pause length to be set. Command buttons 732 and 734 allow a user to approve or cancel a change. A frame 740 contains a playlist duration that is used to set the duration to be displayed in the environment interface 274. A drop-down list box 742 allows the selections of the playlist duration. Command buttons 744 and 746 allow a user to approve or cancel the change. A frame 760 allows a user to select the length of time to add to a playlist using a drop-down list box 764 and command buttons 766 and 768.

Figure 21:
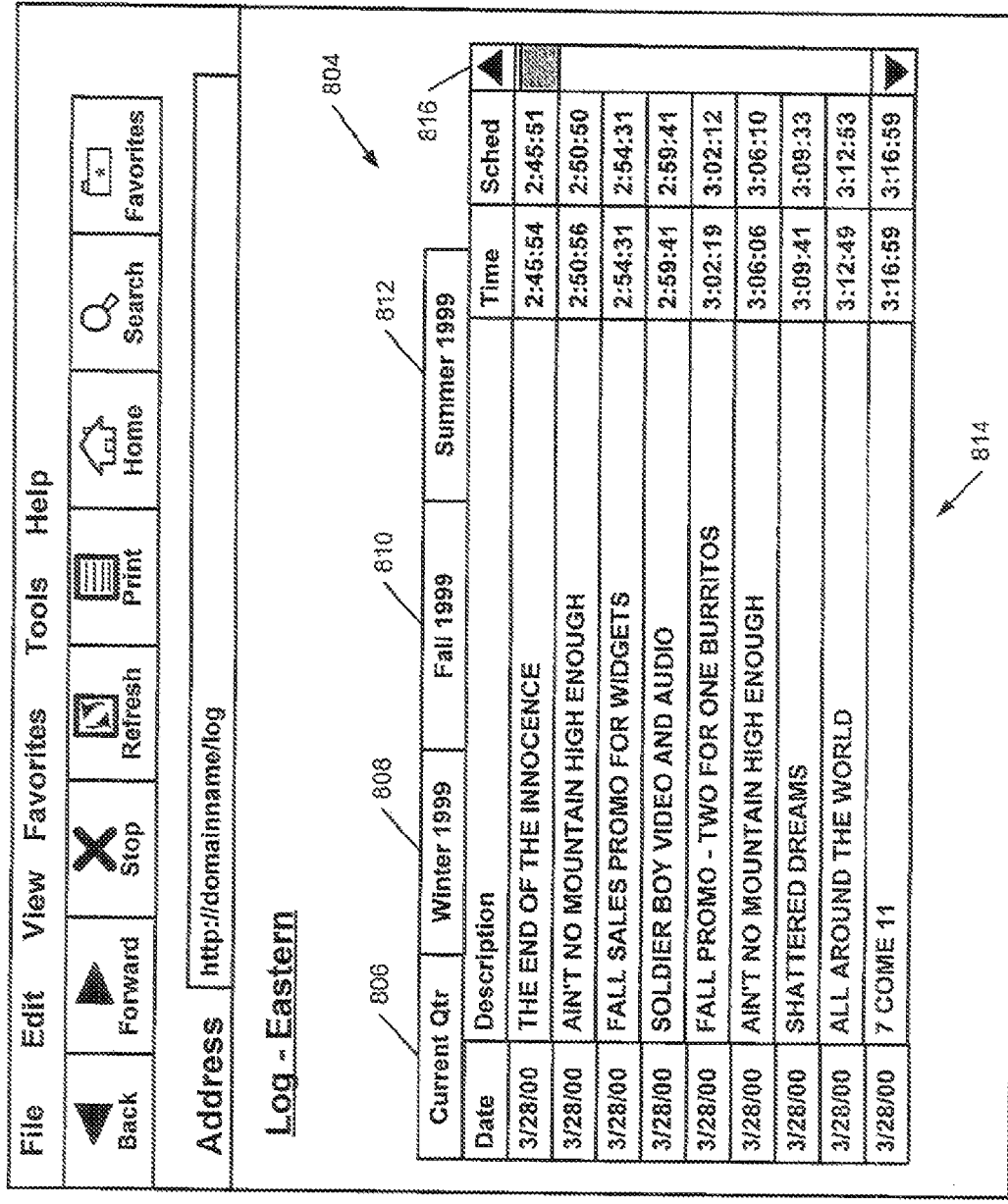
FIG. 21 illustrates a log interface for the continuous play background media system.

Referring now to FIG. 21, using a log link 800, a user triggers the web server 14 to download log-related executable file that provides a log interface 804. Control buttons 806, 808, 810, and 812 filter a log list 814 which displays date, description, schedule time and actual time fields. A scroll bar 816 allows the user to scroll through the log list. Sorting is performed when a field description is selected.

As can be appreciated by the foregoing, the continuous play background media system according to the invention allows continuous play programs to be managed remotely from the playback control devices if desired. The continuous play background media system also allows multiple locations to be controlled using the same continuous play program. Furthermore, the collections of music, announcement and video can be tailored almost infinitely to create any kind of environment desired.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method executed at a computing device for providing digital content, comprising:
   remotely providing digital media files via a network to a playback device responsively to a computer being remotely located from both:
     the computing device; and
     the playback device;
   receiving at least one first communication from the computer via the network; and
   sending at least one second communication to the playback device via the network and based upon the first communication;
   wherein, playback of ones of the provided digital media files at the playback device is modified responsively to the at least one second communication.

2. The method of claim 1, wherein the digital media files comprise audio files, video files, and/or image files.

3. The method of claim 1, further comprising remotely serving executable files that allow the computer to select and arrange custom playlists by selecting a plurality of the digital media files from a master library and allowing sequencing the digital media files and/or randomly playing the digital media files.

4. The method of claim 1, further comprising remotely serving executable files that allow the computer to select a plurality of predetermined collections of the digital media files, to allocate percentages of time for playing the collections and to create a composite collection that randomly selects the digital media files from the collections based on the allocated percentages.

5. The method of claim 1, further comprising remotely serving executable files that allow the computer to select at least one of the digital media files within predetermined collections and to adjust a frequency at which the at least one of the digital media files is played in a composite collection.

6. The method of claim 1, further comprising remotely serving executable files that allow the computer to select at least one temporal period to operate the playback device.

7. A computer device for providing digital content, comprising:
- means for remotely providing digital media files via a network to a playback device responsively to a computer being remotely located from both:
  - the computer device; and
  - the playback device;
- means for receiving at least one first communication from the computer via the network; and
- means for sending at least one second communication to the playback device via the network and based upon the at least one first communication;
- wherein, playback of ones of the provided digital media files at the playback device is modified responsively to the at least one second communication.

8. The computer device of claim 7, wherein the digital media files comprise audio files, video files, and/or image files.

9. The computer device of claim 7, further comprising means for remotely serving executable files that allow the computer to select and arrange custom playlists by selecting a plurality of the digital media files from a master library and allowing sequencing the digital media files and/or randomly playing the digital media files.

10. The computer device of claim 7, further comprising means for remotely serving executable files that allow the computer to select a plurality of predetermined collections of the digital media files, to allocate percentages of time for playing the collections and to create a composite collection that randomly selects the digital media files from the collections based on the allocated percentages.

11. The apparatus of claim 7, further comprising means for remotely serving executable files that allow the computer to select at least one of the digital media files within predetermined collections and to adjust a frequency at which the at least one of the digital media files is played in a composite collection.

12. The computer device of claim 7, further comprising means for remotely serving executable files that allow the computer to select at least one temporal period to operate the playback device.

13. Computer code embodied on a non-transitory computer readable medium, the computer code comprising:
- code configured to remotely provide digital media files via a network to a playback device responsively to a computer being remotely located from both:
  - the apparatus; and
  - the playback device;
- code configured to receive at least one first communication from the computer via the network; and
- code configured to send at least one second communication to the playback device via the network and based upon the at least one first communication;
- wherein, playback of ones of the provided digital media files at the playback device is modified responsively to the at least one second communication.

14. The computer code of claim 13, wherein the digital media files comprise audio files, video files, and/or image files.

15. The computer code of claim 13, further comprising code configured to remotely provide executable files that allow the computer to select and arrange custom playlists by selecting a plurality of the digital media files from a master library and allowing sequencing the digital media files and/or randomly playing the digital media files.

16. The computer code of claim 13, further comprising code configured to remotely provide executable files that allow the computer to select a plurality of predetermined collections of the digital media files, to allocate percentages of time for playing the collections and to create a composite collection that randomly selects the digital media files from the collections based on the allocated percentages.

17. The computer code of claim 13, further comprising code configured to remotely provide executable files that allow the computer to select at least one of the digital media files within predetermined collections and to adjust a frequency at which the at least one of the digital media files is played in a composite collection.

18. The computer code of claim 13, further comprising code configured to remotely provide executable files that allow the computer to select at least one temporal period to operate the playback device.

* * * * *